(12) United States Patent
Lee et al.

(10) Patent No.: US 10,795,094 B2
(45) Date of Patent: Oct. 6, 2020

(54) OPTICAL FIBER CONNECTOR

(71) Applicant: Senko Advanced Components, Inc., Marlborough, MA (US)

(72) Inventors: Benjamin Lee, Wayland, MA (US); Jimmy Jun-Fu Chang, Worcester, MA (US); Kimman Wong, Kowloon (CN); Kazuyoshi Takano, Southborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/980,472

(22) Filed: May 15, 2018

(65) Prior Publication Data

US 2019/0353852 A1  Nov. 21, 2019

(51) Int. Cl.
*G02B 6/38* (2006.01)
(52) U.S. Cl.
CPC ......... *G02B 6/3871* (2013.01); *G02B 6/3825* (2013.01); *G02B 6/3882* (2013.01)
(58) Field of Classification Search
CPC ... G02B 6/3871; G02B 6/3825; G02B 6/3882
See application file for complete search history.

(56) References Cited

U.S. PATENT DOCUMENTS

| 3,745,887 A * | 7/1973 | Striegl ............... F01B 3/045 92/146 |
| 4,370,631 A * | 1/1983 | Gerber ............... H01P 1/10 251/129.13 |
| 4,722,226 A * | 2/1988 | Edmonds ............... G01N 29/14 73/593 |
| 4,725,116 A * | 2/1988 | Spencer ............... G02B 6/3604 385/26 |
| 5,124,606 A * | 6/1992 | Eisenbeis ............... H02K 17/30 112/277 |
| 7,775,502 B2 * | 8/2010 | Ohta ............... F16K 27/067 251/163 |
| 9,618,702 B2 | 4/2017 | Takano et al. |

(Continued)

OTHER PUBLICATIONS

Nishimura, et al. High-Density Multi-Fiber Connectors for Optical Interconnection, Furukawa Review, No. 34, 2008, Tokyo, Japan.

(Continued)

*Primary Examiner* — Akm E Ullah
(74) *Attorney, Agent, or Firm* — Edward S. Jarmolowicz, Esq.

(57) ABSTRACT

An optical fiber connector includes an optical fiber ferrule and a single-piece housing in which the ferrule is received. The housing can be installed in an adapter to make an optical connection. A rotational locking mechanism has a rotor mounted on the housing for rotation with respect the housing about a rotational axis. The rotor can be rotated between a locked position and an unlocked position. The rotational locking mechanism is configured to inhibit the housing from being withdrawn from the adapter in the locked position of the rotor and to permit the housing to be withdrawn from the adapter in the unlocked position, and further comprising a guide pin, wherein the housing comprises an integral guide pin retainer configured to hold the guide pin in place on the housing.

16 Claims, 20 Drawing Sheets

(56) References Cited

U.S. PATENT DOCUMENTS

| | | | |
|---|---|---|---|
| 9,690,069 B2 | 6/2017 | Chang | |
| 9,726,831 B2 * | 8/2017 | Gniadek | G02B 6/3891 |
| 10,018,272 B2 * | 7/2018 | Toth | F16J 15/164 |
| 2009/0220200 A1 | 9/2009 | Wong et al. | |
| 2010/0111477 A1 * | 5/2010 | Strasser | G02B 6/3893 |
| | | | 385/56 |
| 2013/0322825 A1 | 12/2013 | Cooke et al. | |
| 2015/0212282 A1 | 7/2015 | Lin | |
| 2016/0116685 A1 | 4/2016 | Wong et al. | |
| 2016/0349458 A1 * | 12/2016 | Murray | G02B 6/3825 |

OTHER PUBLICATIONS

Shimoji et al., Development of Mini-MPO Connector, Furakawa Review, No. 18, 1999, 5 Page.

Wase et al., Optical Components for High-Density Optical Inter-Connect System: OptoUnity, Furukawa Review, No. 32, 2007, Tokyo, Japan.

International Search Report and Written Opinion, Application No. PCT/US2019/032185, dated Sep. 23, 2019, pp. 7.

* cited by examiner

OPTICAL FIBER CONNECTOR

FIELD OF INVENTION

This disclosure generally relates to optical fiber connectors such as multi-fiber push-on (MPO) connectors.

BACKGROUND

An optical fiber connector is configured to mechanically couple the end of an optical fiber cable to another optical fiber structure (e.g., an adapter, another connector, a transceiver, etc.) to establish an optical connection between one or more pairs optical fibers. That is, an optical fiber connector generally functions as a mechanical coupling device that is configured to align opposed ends of optical fibers for optical communication. An MPO connector is an industry standard form of optical fiber connector that is configured to establish an optical connection of a multi-fiber ferrule.

An MPO connector is typically plugged into an adapter that facilitates aligning the connector with another connector or optical device. An adapter has a front side (e.g., an in-front-of-the-wall side) and a rear side (e.g., a behind-the-wall side). Connectors can be installed in one or more positions on the front side of an adapter. In a cable-to-cable adapter, connectors can also be installed at one or more positions on the rear side of the adapter. The adapter aligns connectors installed in the front and rear sides of the adapter for optical communication. Other types of adapters can be configured for aligning connectors installed in the front side of the adapter with other optical devices that are installed on the rear side of the adapter.

A conventional MPO connector includes a housing, a locking mechanism, a ferrule assembly, and a ferrule spring. A locking mechanism can be mounted on the housing for locking the MPO connector in place in an adapter. Various locking mechanisms for MPO connectors are known. For example, a rotational locking mechanism is disclosed in U.S. Pat. No. 9,726,831, which is attached as an Appendix. The housing of an MPO connector defines an interior configured to receive the ferrule assembly. Conventionally, the ferrule assembly includes a guide pin subassembly comprising first and second guide pins mounted on a pin holder that is separate from the housing. The ferrule assembly also includes a ferrule that has guide pin holes. The ferrule can be installed on the guide pin subassembly by inserting the guide pins through the holes. The ferrule assembly can be installed as a unit in the interior of the housing. When the ferrule assembly is installed in the housing, the housing permits relative movement between the ferrule assembly and the housing (e.g., the ferrule assembly can "float" relative to the housing). The ferrule spring is received between the proximal end of the ferrule assembly and the proximal end of the housing. The ferrule spring yieldably biases the ferrule assembly distally with respect to the housing, allowing the ferrule assembly to float within the housing.

SUMMARY OF INVENTION

In one aspect, an optical fiber connector generally comprises an optical fiber ferrule and a single-piece housing. The ferrule is received inside the housing. The housing is configured to be installed in an adapter to make an optical connection. A rotational locking mechanism comprises a rotor mounted on the housing for rotation with respect the housing about a rotational axis. The rotor is rotatable between a locked position and an unlocked position. The rotational locking mechanism further comprises a guide pin. The housing has an integral guide pin retainer configured to hold the guide pin in place on the housing.

In another aspect of the present invention, an optical fiber connector generally comprises an optical fiber ferrule and a single-piece housing having a length with opposing tabs. The ferrule is received inside the housing and secured by the tabs. The housing and the ferrule are configured to be in direct engagement with one another, so that the direct engagement between the housing and the ferrule is configured to substantially block movement of the ferrule with respect to the housing along the length of the housing. The optical fiber connector is free of a ferrule spring.

In yet another aspect of the present invention, an optical fiber connector generally comprises an optical fiber ferrule and a single-piece housing. The ferrule is received inside the housing, and the housing is configured to be installed in an adapter to make an optical connection. The housing has a distal end portion and a proximal end portion, and the proximal end portion of the housing comprises a shaft having an axis. The shaft comprises first and second shaft members, each of which has a proximal end portion defining a lip. A rotor configured to be mounted on the shaft for rotation with respect the shaft about the axis is rotatable between a locked position and an unlocked position. The rotor is configured to inhibit the housing from being withdrawn from the adapter in the locked position of the rotor and to permit the housing to be withdrawn from the adapter in the unlocked position. The rotor comprises a rotor body having a proximal end and a distal end spaced apart along the axis. The rotor body defines a hole extending through the rotor body along the axis and a chamfered edge surface adjacent the distal end of the rotor body that extends around at least a portion of the hole. Thus, the rotor is configured to be pressed distally onto the shaft such that the shaft extends through the hole and the lips of the first and second shaft members and engages the proximal end of the rotor body to inhibit the rotor from moving proximally along the axis with respect to the shaft. The chamfered edge surface is configured to engage the free ends of the first and second shaft member and deflect the first and second shaft members toward one another as the rotor is pressed onto the shaft.

Other aspects and features will be in part apparent and in part pointed out apparent hereinafter.

BRIEF DESCRIPTION OF THE DRAWINGS

Corresponding reference characters indicate corresponding parts throughout the drawings.

DETAILED DESCRIPTION

Figure 1:
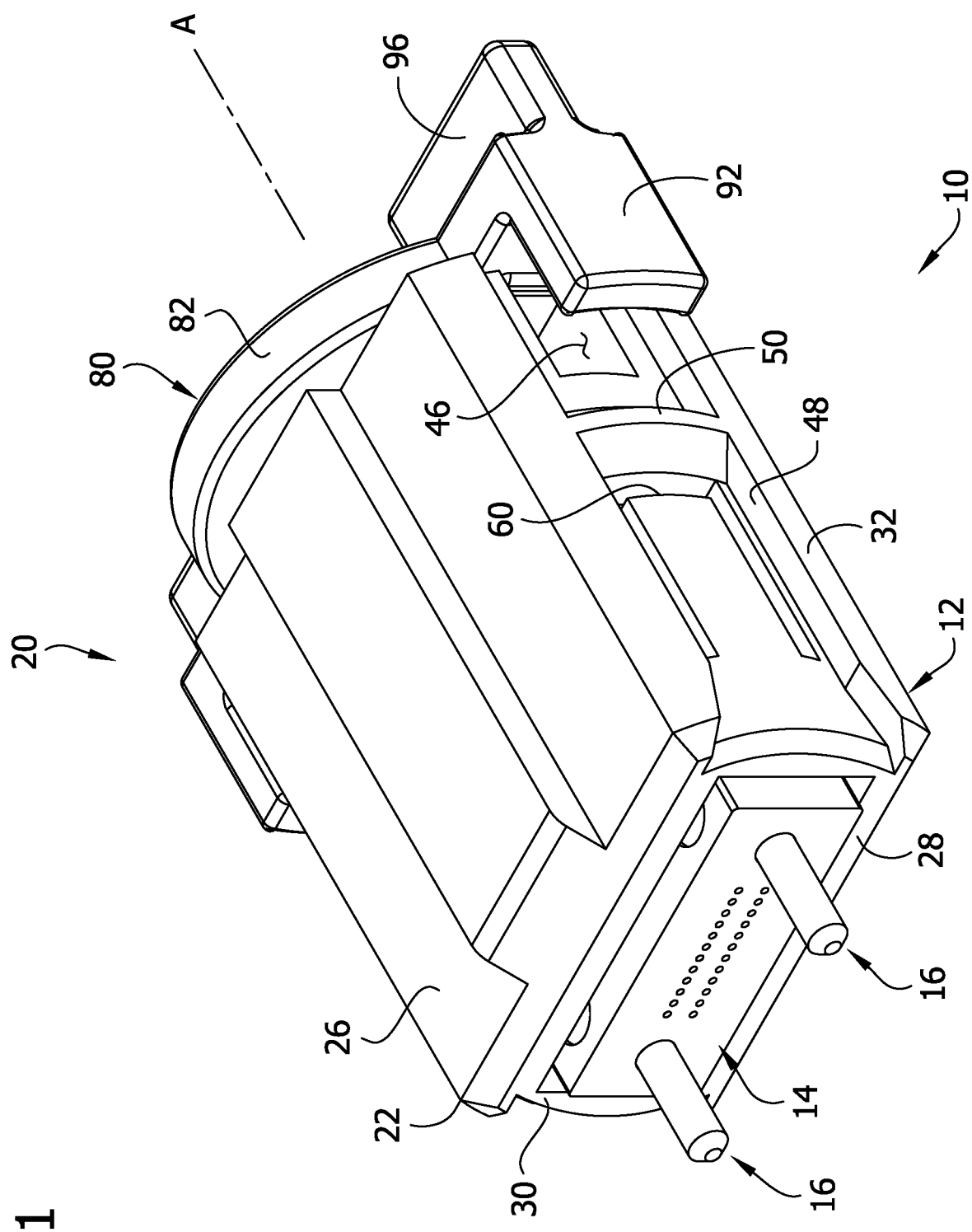
FIG. 1 is a perspective of an optical fiber connector comprising a rotational locking mechanism.
Figure 2:
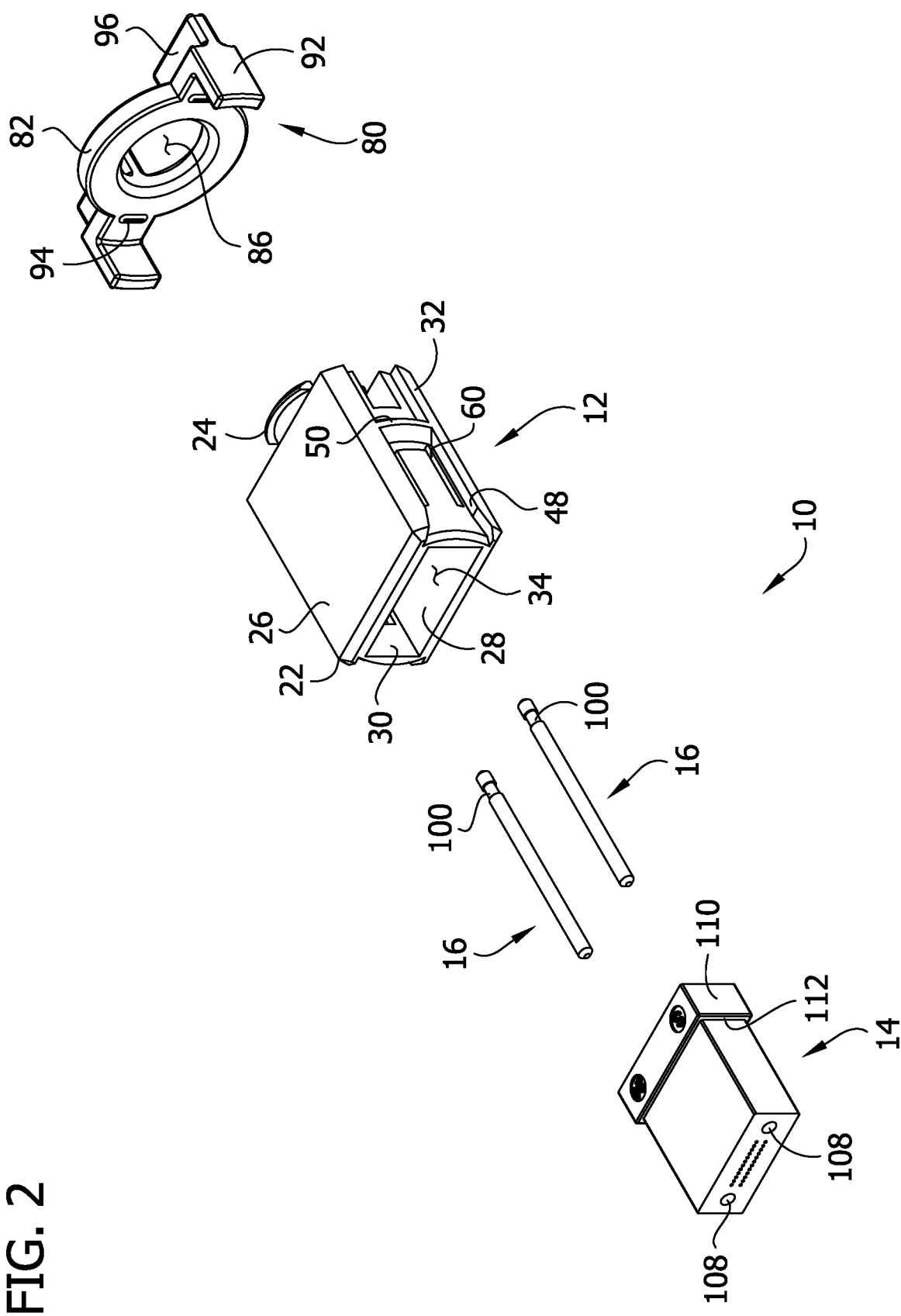
FIG. 2 is an exploded perspective of the connector.
Figure 3:
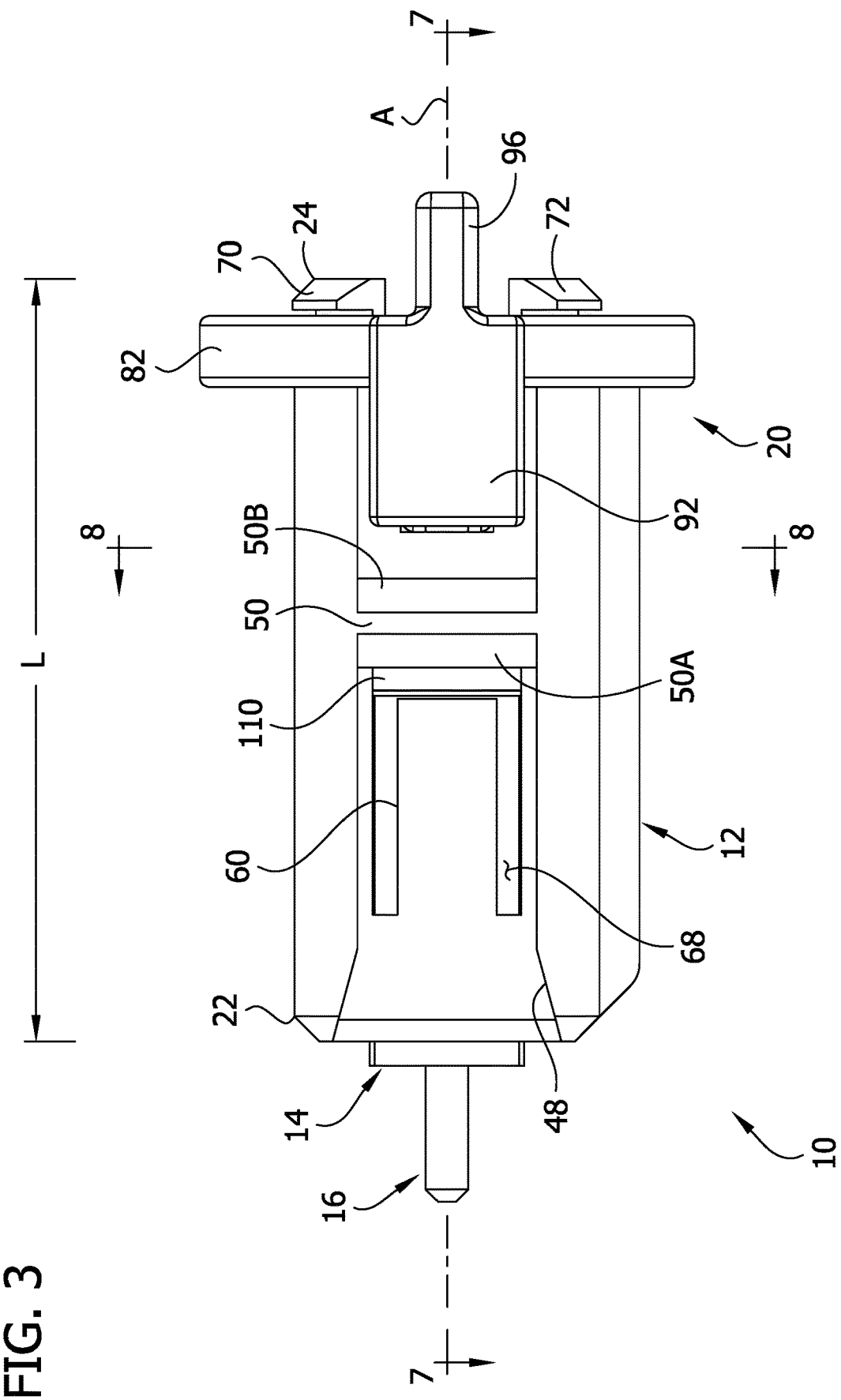
FIG. 3 is a side elevation of the connector.

Referring to FIGS. 1-3, one embodiment of an optical fiber connector is generally indicated at reference number 10. In the illustrated embodiment, the connector 10 comprises an MPO connector. However, aspects of the disclosure can be used with other types of connectors without departing from the scope of the invention. The connector 10 comprises a one-piece, monolithic housing, generally indicated at reference number 12. The housing could comprise a multi-piece assembly in other embodiments. As will be explained in further detail below, the housing 12 includes features for mounting an optical fiber ferrule, generally indicated at 14, without a ferrule spring. In addition, the housing 12 includes features for mounting guide pins, generally indicated at 16, without a separate pin holder. As is further explained below, the housing 12 includes components of a rotational locking mechanism, generally indicated at 20, which is configured to facilitate manually locking the connector in place in an adapter A (see, FIGS. 15A-15F). Without departing from the scope of the invention, housing 12 is a single, molded component.

Figure 4:
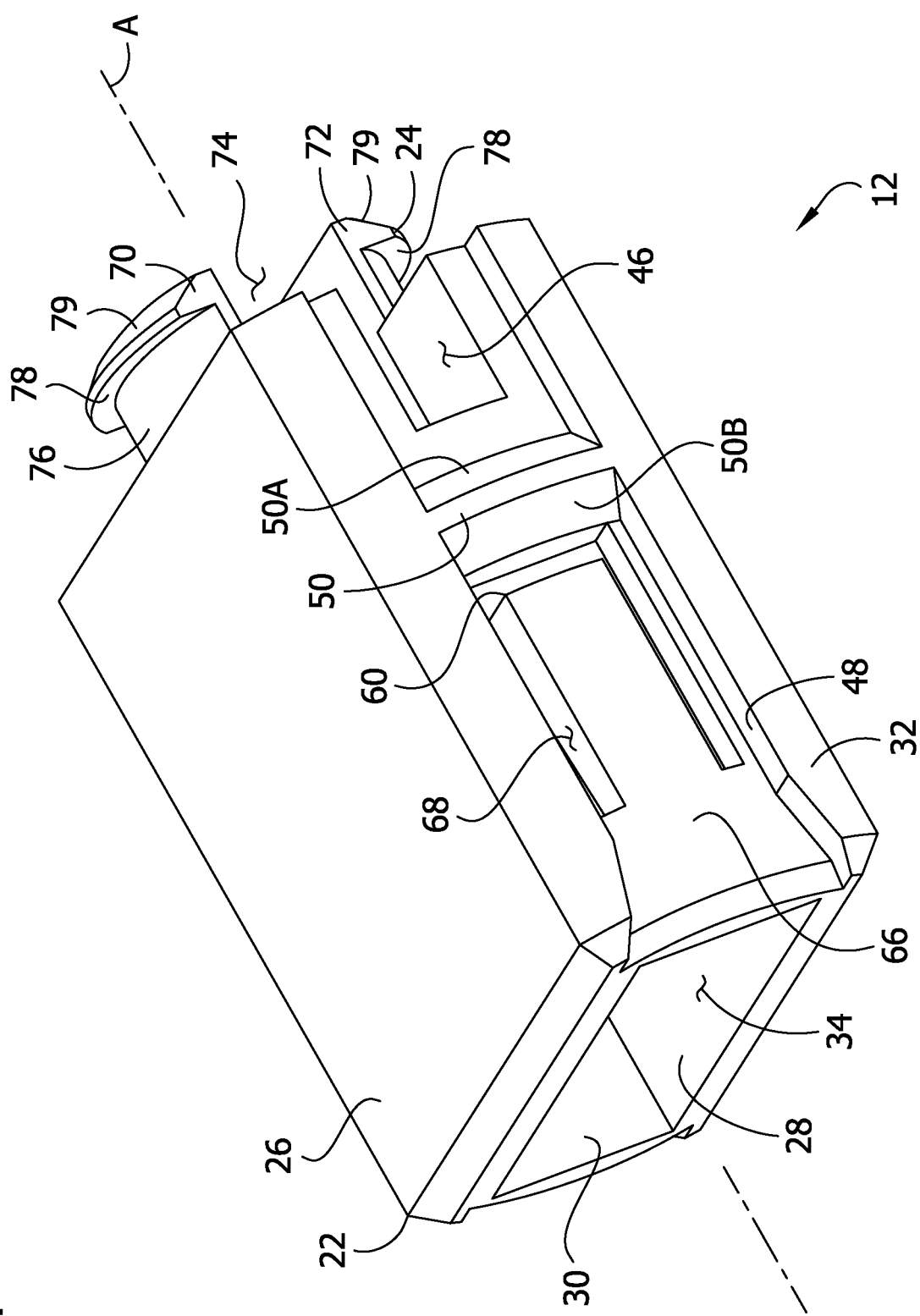
FIG. 4 is a perspective of a housing of the connector.
Figure 5:
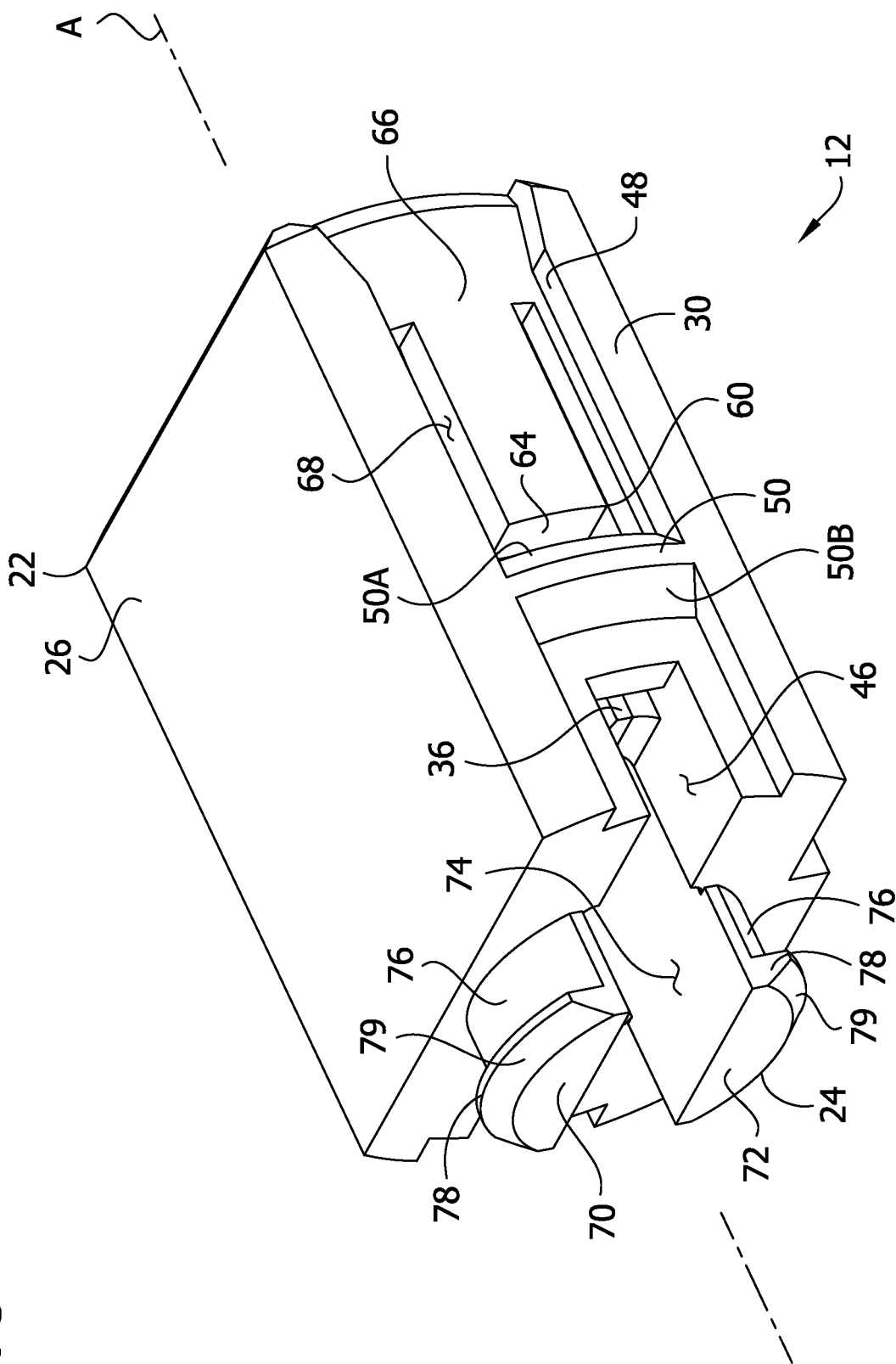
FIG. 5 is another perspective of the housing.

Referring to FIGS. 4 and 5, the housing 12 includes a ferrule receiver 22 and a locking mechanism shaft 24. The ferrule receiver 22 defines a distal end of the housing 12 and the locking mechanism shaft 24 defines the proximal end of the housing. The housing has a length L (FIG. 3) extending from the proximal end of the housing to the distal end of the housing. The housing 12 shaped and arranged so that the distal end of the housing (e.g., the ferrule receiver 22) can be installed in the adapter A and so that an optical fiber cable (not shown) can extend from inside the ferrule receiver (where it may be operably connected to the ferrule 14) through the proximal end of the housing.

Throughout this disclosure, terms of relative position, such as top, bottom, up, down, above, below, left, right, side, etc., refer to the orientation of features as shown in the drawings. It will be understood that the relative positions of the features can vary from what is shown in the drawings during use. Thus, unless otherwise indicated, such terms of position should be understood to be used in the relative, and not absolute, sense.

Figure 6:
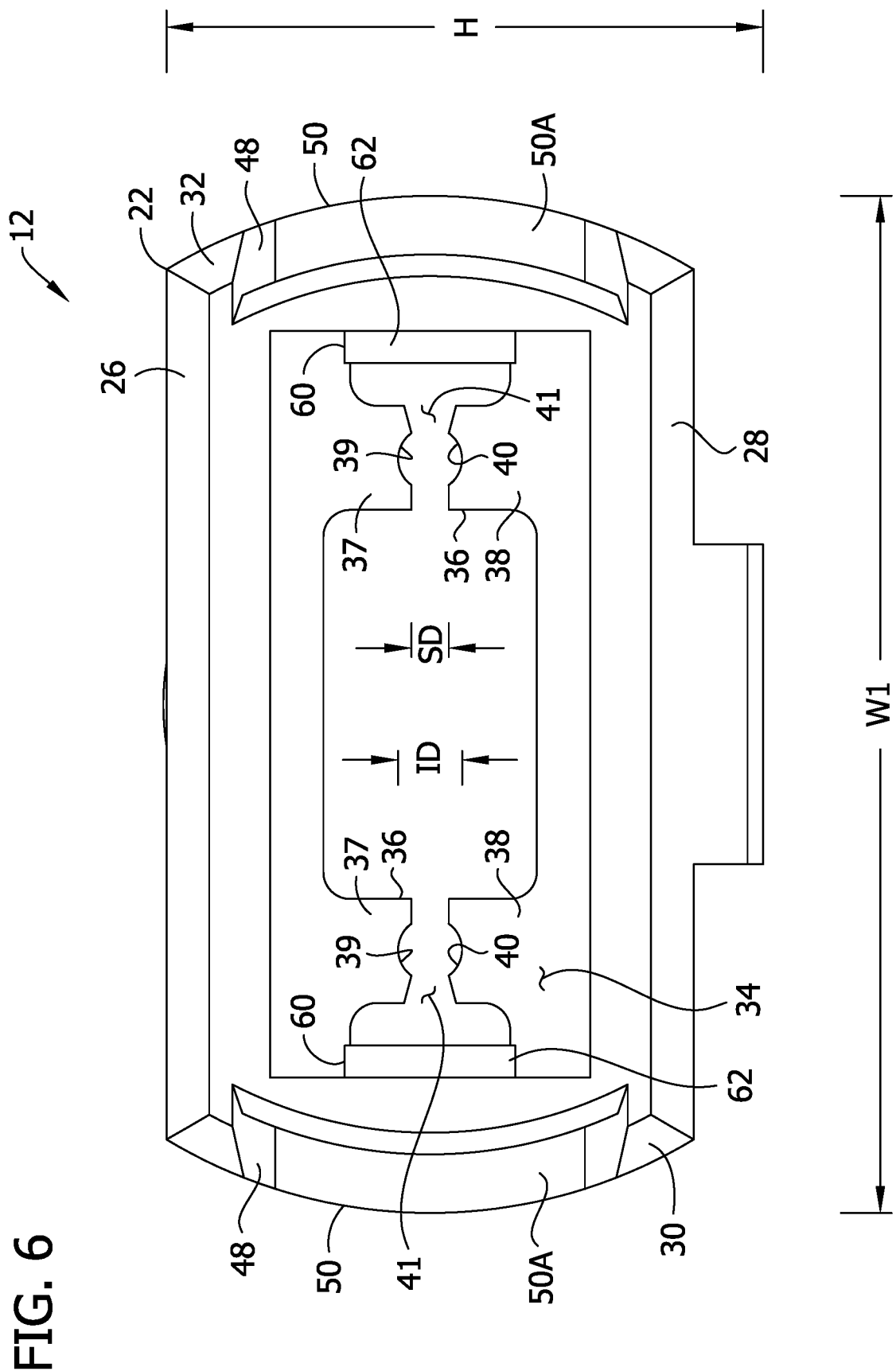
FIG. 6 is a distal end elevation of the housing.
Figure 7:
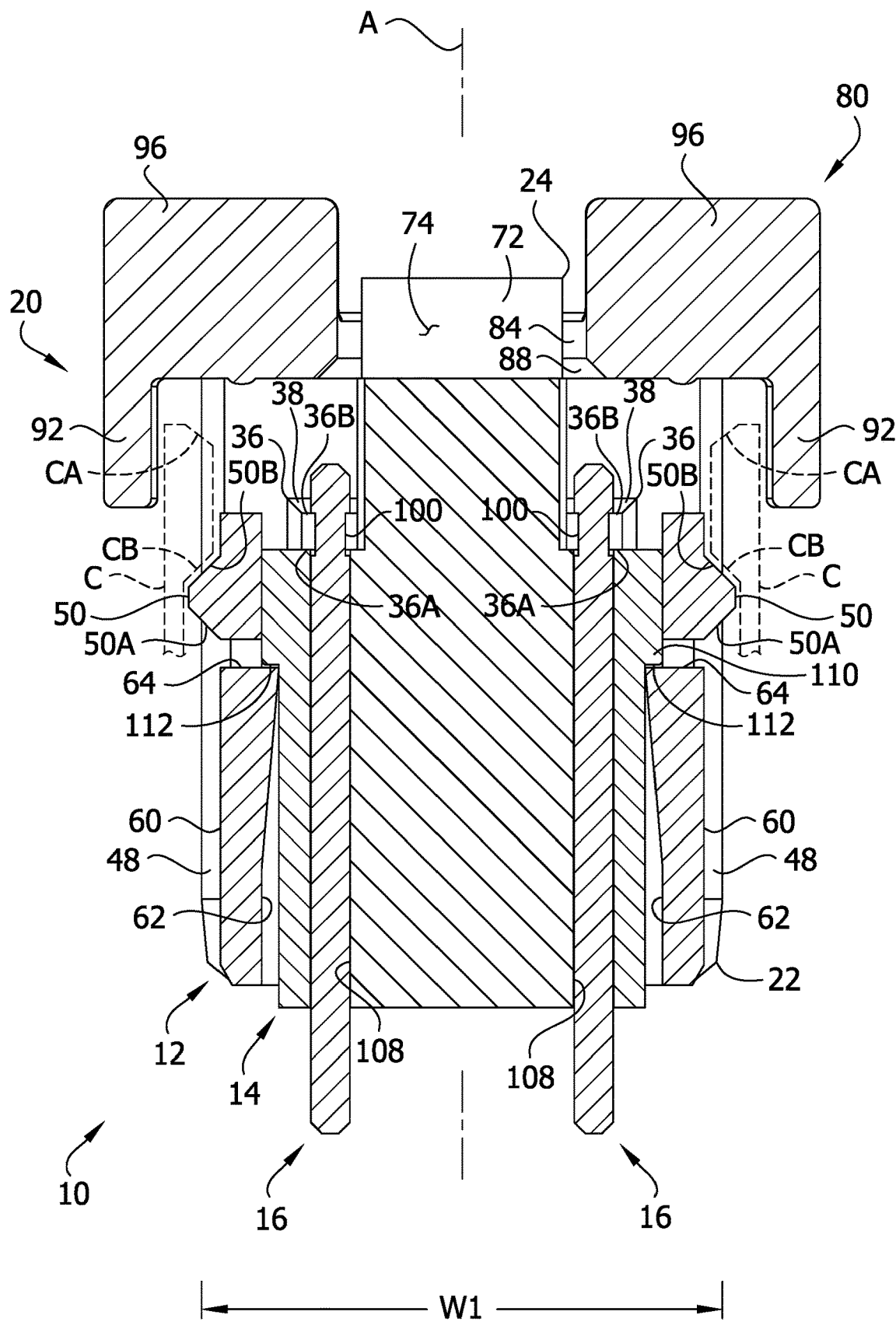
FIG. 7 is a cross section taken in the plane of line 7-7 of FIG. 3.
Figure 8:
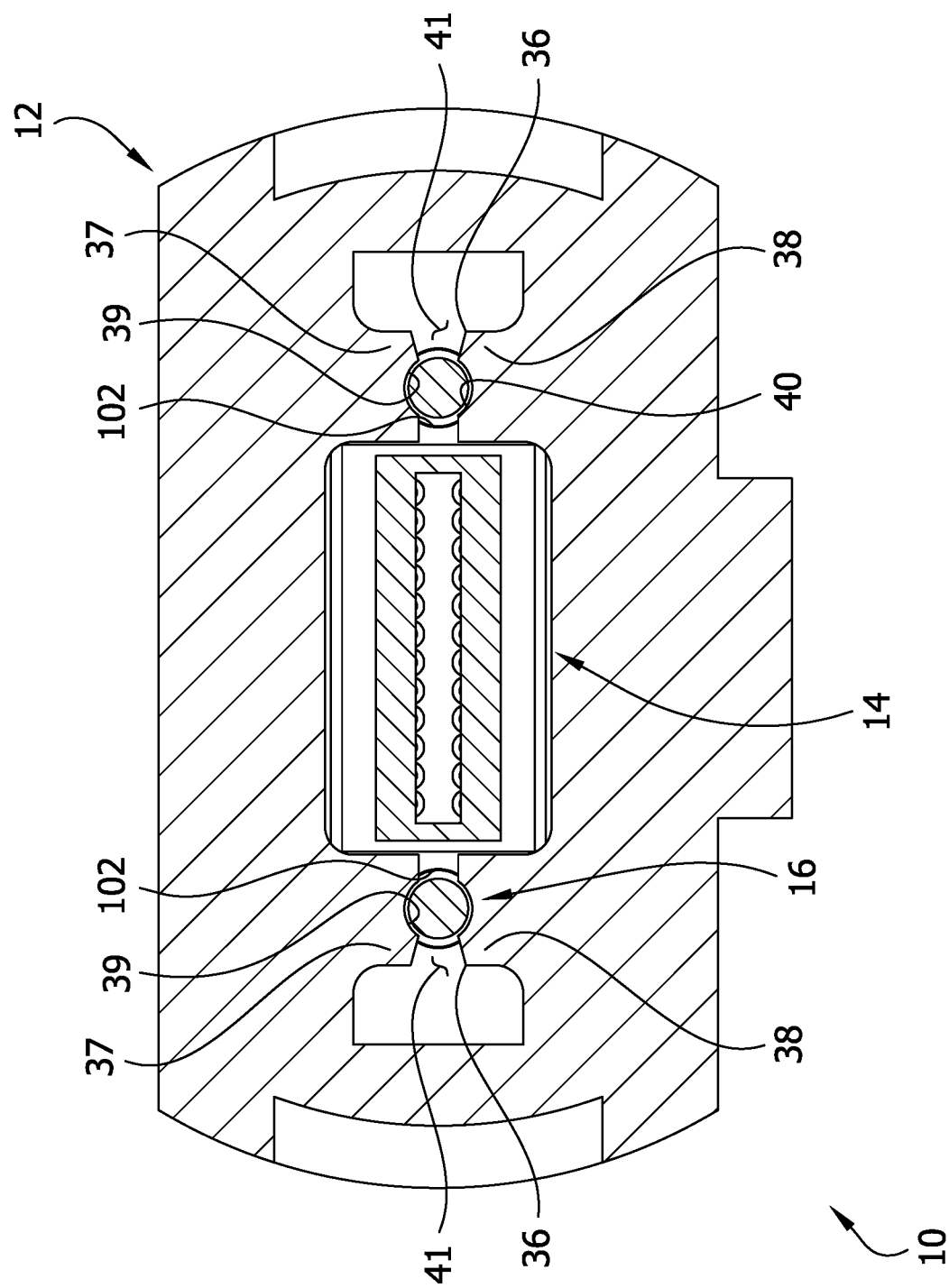
FIG. 8 is a cross section taken in the plane of line 8-8 of FIG. 3.
Figure 9:
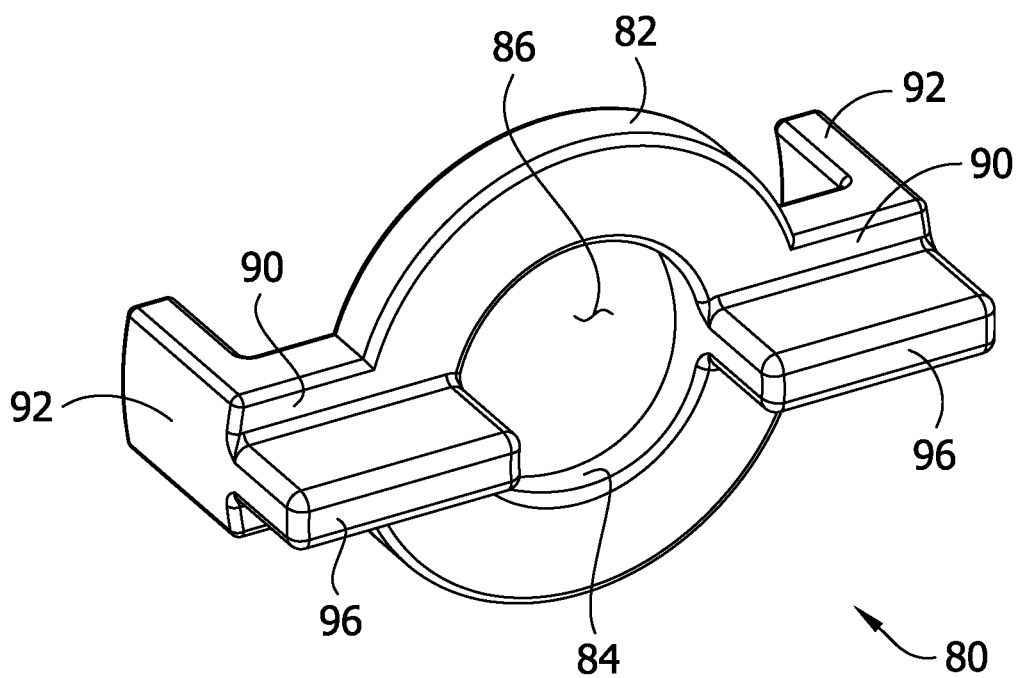
FIG. 9 is a perspective of a rotational locking member of the connector.

Referring to FIGS. 4-6, the ferrule receiver 22 has a generally rectangular cross-sectional shape, although it could have other shapes in other embodiments. The ferrule receiver 22 has a top wall 26, a bottom wall 28, and opposite first and second side walls 30, 32 that together define a perimeter of the ferrule receiver. The ferrule receiver 22 has a width W1 (FIG. 6) extending between the side walls 30, 32 and a height H extending between the top and bottom walls 26, 28. The perimeter of the ferrule receiver 22 extends around an interior 34. As will be explained below, features of the housing 12 are configured to mount the ferrule 14 and the guide pins 16 in the interior 34 of the ferrule receiver 22. The distal end of the ferrule receiver 22 is open such that the ferrule 14 and the guide pins 16 can be placed in the housing through the open distal end. As shown in FIGS. 7 and 8, the proximal end of the ferrule receiver 22 is also generally open, except that integral guide pin retainers 36 extend into the interior 34 adjacent the proximal end of the ferrule receiver. As will be explained below, each guide pin retainer 36 is configured to mount a guide pin 16 in the interior 34 of the ferrule receiver 22. In addition, the guide pin retainers 36 are configured to provide a portion of a stop that engages the proximal end of the ferrule 14 when the ferrule is placed into the interior 34 of the ferrule receiver 22.

Figure 7A:
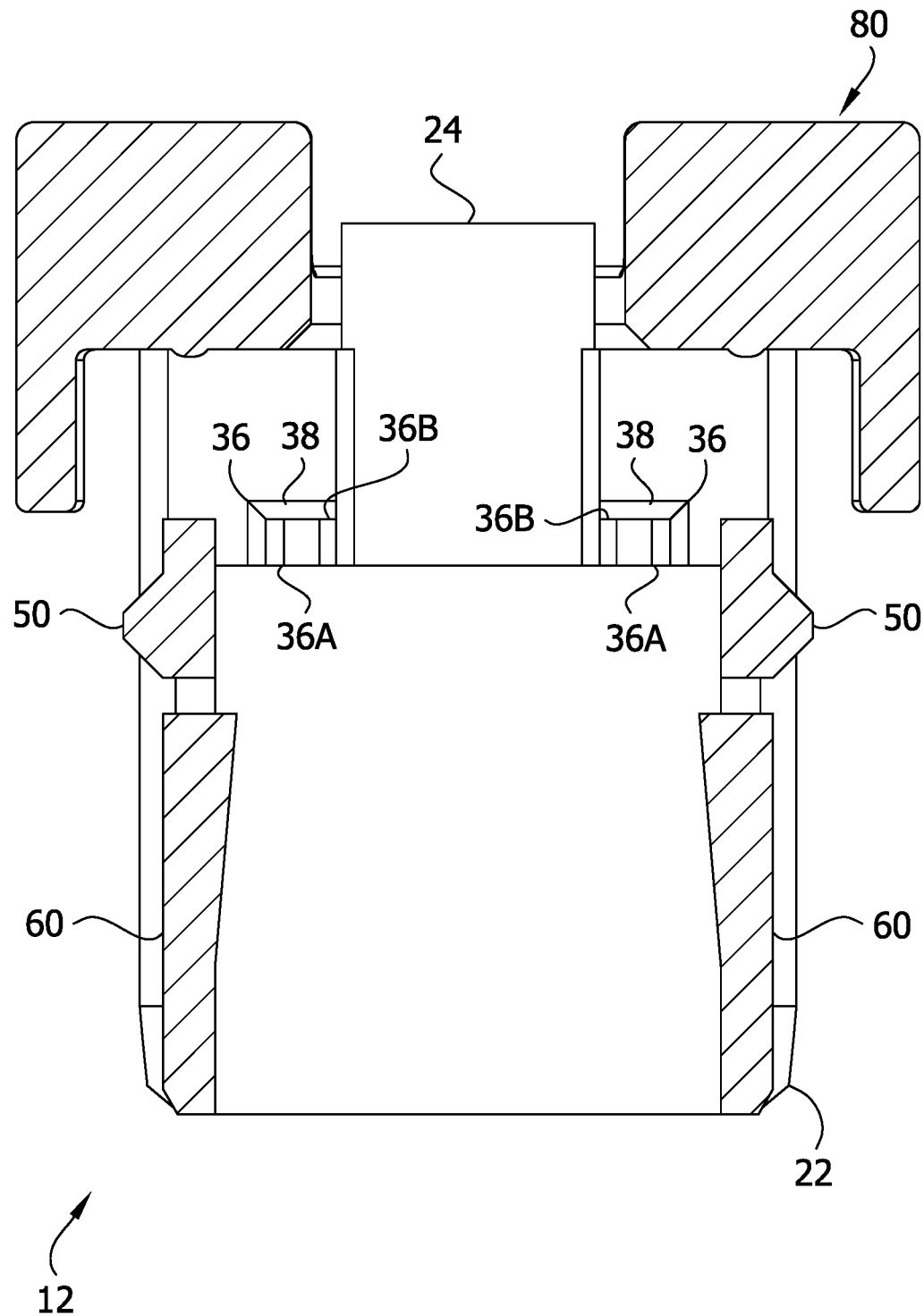
FIG. 7A is similar to FIG. 7 except that internal components of the connector are removed.

In general, each guide pin retainer 36 is formed integrally with the housing 12 and comprises structure that defines a recess for receiving a portion of a guide pin 16 therein to operably attach the guide pin to the housing 12. In one or more embodiments, the guide pin retainer comprises a clip for clipping the guide pin 16 in place with respect to the housing 12. For example, the retainer 36 can be configured so that a guide pin 16 can snap into place in the retainer whereby the retainer attaches the guide pin to the housing. The retainer can also hold the guide pin in the housing in other ways in other embodiments. In the illustrated embodiment, the guide pin retainer 36 extends along the length L (refer to FIG. 3) of the housing 12 from a distal end 36A to a proximal end 36B (FIGS. 7, 7A).

Referring to FIG. 6, in the illustrated embodiment, each guide pin retainer 36 comprises a top brace 37 projecting downward from the top wall 26 to a respective free end and a bottom brace 38 projecting upward from the bottom wall 28 to a respective free end. The guide pin retainer could also comprise a single brace (e.g., a single structure could extend contiguously from the top wall to the bottom wall) or another configuration without departing from the scope of the invention. The top braces 37 are formed integrally with the top wall 26 from a single, monolithic piece of material. Likewise, the bottom braces 38 are formed integrally with the bottom wall 28 from a single, monolithic piece of material. Moreover, both pin retainers 36 are integrally formed with the housing 12 from a single, monolithic piece of material. It will be understood that, in some embodiments, the pin retainers could be formed separately from the housing without departing from the scope of the invention.

Still referring to FIG. 6, top and bottom braces 37, 38 of each retainer 36 are aligned along the length L of the housing 12 and aligned along the width W1 of the ferrule receiver 22 for receiving a guide pin 16 between opposed free ends of the braces. In the illustrated embodiment, the free ends of the top and bottom braces 37, 38 in each pin retainer 36 have generally mirror image cross-sectional shapes. The free end of each of the top and bottom braces 37, 38 defines a respective recess 39, 40 that is sized and arranged for receiving a portion of the guide pin 16 therein as explained below. In the illustrated embodiment, the recesses 39, 40 comprise depressions that have generally arcuate cross-sectional shapes. For example, the opposed recesses 39, 40 circumscribe portions of a circle having a diameter ID equal to an effective inner diameter of the recesses of the retainers 36. The free ends of the braces 37, 38 are spaced apart along the height H of the ferrule receiver 22 by a spacing distance SD at the edges of the recesses 39, 40. The spacing distance SD is less than the effective inner diameter ID of the recesses. 39, 40 Recesses of other shapes can also be used without departing from the scope of the invention.

Still referring to FIG. 6, in each guide pin retainer 36, the free ends of the braces 37, 38 also define a channel 41 configured for guiding the guide pin 16 into the recess 39, 40. The channel 41 is in communication with the recesses 39, 40 such that a guide pin 16 can be inserted through the channel into the recesses 39, 40. In the illustrated embodiment, each channel 41 has open ends on opposite sides of the respective guide pin retainer 36. However, it will be understood that the top and bottom braces could also be connected along one side such that the channel has only one open end. The outer end portion of each illustrated channel 41 is outwardly flared. For example, the free end of at least one brace 37, 38 slopes toward the other retainer as it extends inward from a side edge of the brace. As explained below, the guide pin 16 can be inserted into the retainer 36 through the flared end of the channel 41.

Referring to FIGS. 4 and 5, a slot 46 is formed in each side wall 30, 32 at the proximal end portion of the ferrule receiver 22. The slots 46 extend distally along the length L of the housing 12 from the proximal end of the ferrule receiver 22. In the illustrated embodiment, each slot 46 is about equidistant from the top wall 26 and the bottom wall 28 along the height H of the ferrule receiver. In addition, in the illustrated embodiment, the slots 46 are located proximally of the guide pin retainers 36. As will be explained below, the slots 46 are configured to provide a detent feature of the locking mechanism 20.

Referring to FIGS. 4, 5, and 7, each of the side walls 30, 32 defines an external groove 48 for slidably receiving a catch C (FIG. 7) of an adaptor as the connector 10 is inserted into the adapter A. In the illustrated embodiment, each groove 48 extends parallel to the length L of the housing 12 along the entire length of the ferrule receiver 22. The grooves 48 each have a distal end at the distal end of the ferrule receiver 22 and a proximal end at the proximal end of the ferrule receiver. The distal end portion of each groove 48 flares outwardly to aid in guiding the catch C into the groove as the connector 10 is inserted into the adapter A.

Each side wall 30, 32 further defines a rib 50 that protrudes into and blocks the groove 48. In the illustrated embodiment, the rib 50 extends along the height H of the ferrule receiver 22 from a top surface to a bottom surface of the groove 48. As explained in further detail below, the rib 50 is configured to bear against the catch C when the connector 10 is installed in the adapter A to provide a restraint against the connector being withdrawn from the adaptor. The rib 50 has a sloped distal end 50A and a sloped proximal end 50B. Similarly, the catch C has sloped outer end CA and a sloped inner end CB. As will be explained below, the sloped surfaces CA, CB of the catch C are configured to slide over the sloped surfaces 50A, 50B of the rib 50 as the connector 10 is inserted into and withdrawn from the adapter A. Subject to the locking mechanism (as explained below), when the connector 10 is installed in the adapter A, the rib 50 can provide a detent that engages the catch C but allows the catch to slide over the rib when a withdrawal force is imparted on the connector 10. As will be explained below, however, the locking mechanism 20 can also selectively prevent the catch C from sliding over the rib 50 to lock the connector 10 in place in the adapter A.

Each of the side walls 30, 32 of the ferrule receiver 22 also defines a respective tab 60 for securing the ferrule 14 in the housing 12. Each tab 60 has a length extending along the length L of the housing 12 from a respective distal end to a respective proximal end. As shown in FIG. 7, each of the tabs 60 has an inner surface 62 that slants inwardly as it extends proximally along the length of the respective tab. Each tab 60 further defines a proximally facing latch surface 64 that is configured to hold the ferrule 14 in the interior 34 of the ferrule receiver 22, as will be described in further detail below. The latch surface 64 projects inward from the respective side wall 30, 32 along the width W1 with respect to an inboard surface of the respective side wall located proximally of the latch surface. In the illustrated embodiment, each ferrule locking tab 60 comprises a hinge portion 66 at the distal end portion thereof. The locking tab 60 is resiliently bendable at the hinge portion 66 in in a laterally outward direction. The ferrule locking tabs 60 are configured to rebound inward after a bending force on the tabs is released. In the illustrated embodiment, each locking tab 60 is formed integrally with a respective side wall 30, 32 from a single, monolithic piece of material. Moreover, each locking tab 60 is defined on three sides by a space 68 extending through the side wall 30, 32. An outer surface of each locking tab 66 defines a portion of a respective groove 48. Ferrule locking tabs can have other configurations without departing from the scope of the invention.

Referring to FIG. 5, the locking mechanism shaft 24 comprises first and second shaft members 70, 72 that extend proximally from the proximal end of the ferrule receiver 22 along an axis A of the shaft. The shaft members 70, 72 are spaced apart from one another along the height H to define a gap 74. The gap 74 is sized and arranged so that an optical fiber cable (not shown) can extend proximally from the interior 34 of the ferrule receiver 22 through the gap. Each shaft member 70, 72 has an arcuate bearing surface 76 extending circumferentially about the axis A. In cross-section, the bearing surfaces 76 have circular arc shapes. The free end of each shaft member 70, 72 defines a barb portion 78 that extends radially outward from the respective bearing surface 76 to define a mounting lip. An outer proximal edge surface 79 of each barb portion 78 is chamfered. Suitably, the shaft members 70, 72 are configured to resiliently bend or deflect radially inwardly with respect to the axis A when a radially inward force is imparted on the shaft members. The shaft members 70, 72 are configured to rebound outwardly when the force is released.

Referring to FIGS. 9-13, the locking mechanism 20 comprises a locking rotor 80 that is configured to be mounted on the locking mechanism shaft 24 for rotation about the axis A (e.g., a rotational axis). The rotor 80 comprises a central ring 82 (broadly, a rotor body or a portion of a rotor body) having an inner surface 84 defining a hole 86. A distal edge surface 88 of the inner surface 84 is chamfered. The ring 82 is configured to be pressed distally onto the locking mechanism shaft 24. As the ring 82 is pressed onto the locking mechanism shaft the chamfered surface 88 engages the chamfered surfaces 79 of the shaft members 70, 72 and bends the shaft members toward one another. The ring 82 clears the barb portions 78 as it moves distally, and the shaft members 70, 72 rebound outwardly so that the lips of the barbs oppose the proximal end of the ring. The inner surface 84 of the ring 82 is configured to bear against the bearing surfaces 76 of the shaft members 70, 72 such that the locking rotor 80 is constrained to move in rotation about the axis A with respect to the housing 12.

Figure 10:
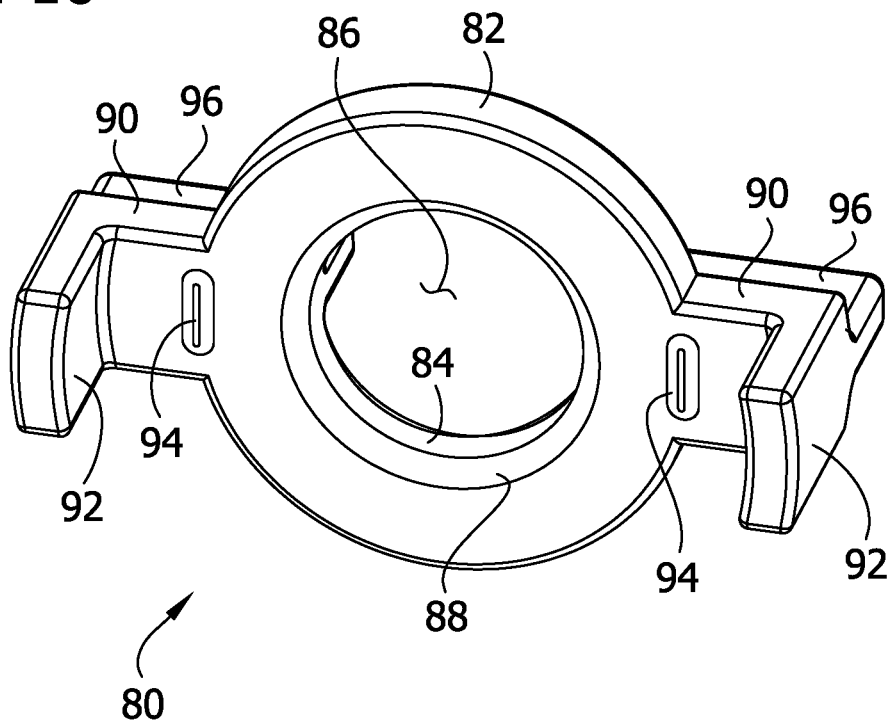
FIG. 10 is another perspective of the rotational locking member.

The locking rotor 80 further includes diametrically opposed arm portions 90 (the arm portions are portions of the rotor body in one or more embodiments) that extend radially outward from the central ring 82. The arm portions 90 have radially outer ends, and the locking rotor comprises locking tabs 92 that extend distally along the axis A from the radially outer ends of the arm portions. As explained below, the locking tabs 92 are sized and arranged to radially overlap the catches C of the adapter A when the locking mechanism 20 is in a locked configuration. Referring to FIG. 10, locking rotor 80 further includes detent protrusions 94 that are formed on the distal end of each arm 90. The detent protrusions 94 are spaced apart radially inwardly from the locking tabs 92. The detent protrusions 94 are configured to engage the housing to provide a restraint against rotation of the rotor 80 about the axis A away from the locked position of the rotor. In one or more embodiments, the detent protrusions could be located on the housing to engage the rotor and provide a restraint against rotation of the rotor about the axis with respect to the housing away from the locked position.

Figure 11:
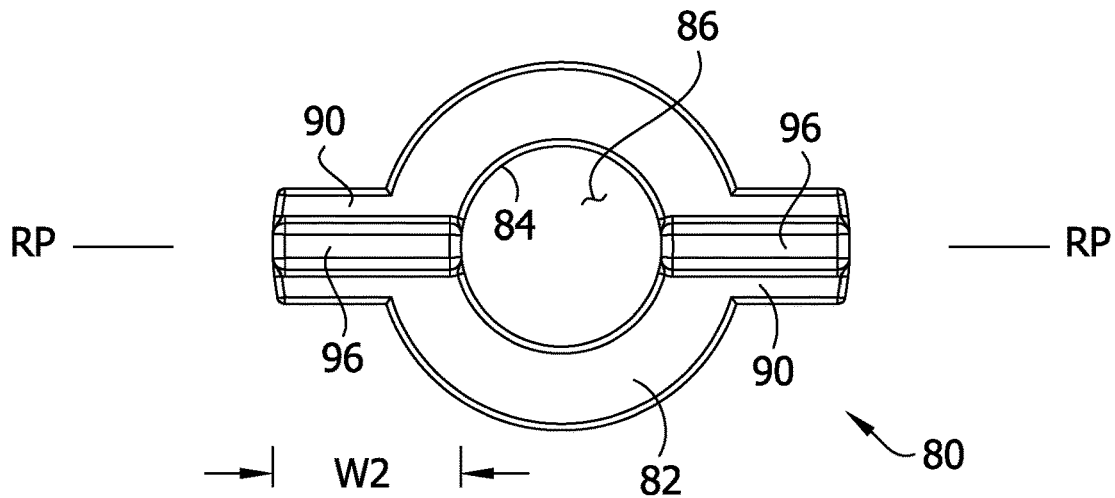
FIG. 11 is a proximal end elevation of the rotational locking member.
Figure 12:
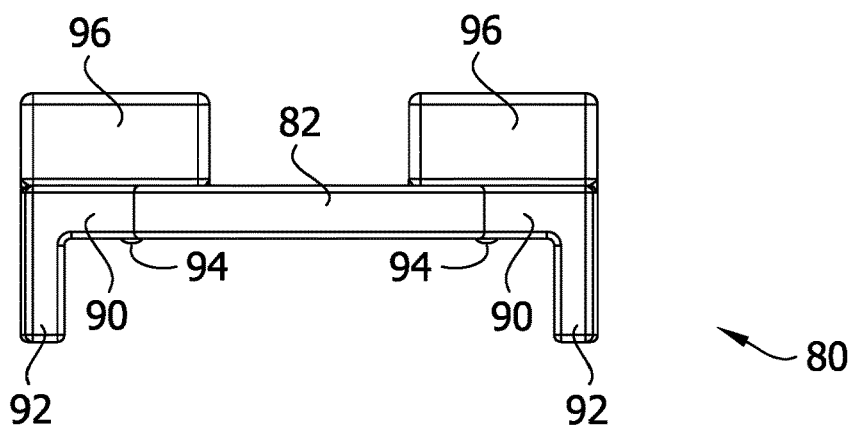
FIG. 12 is a side elevation of the rotational locking member.
Figure 13:
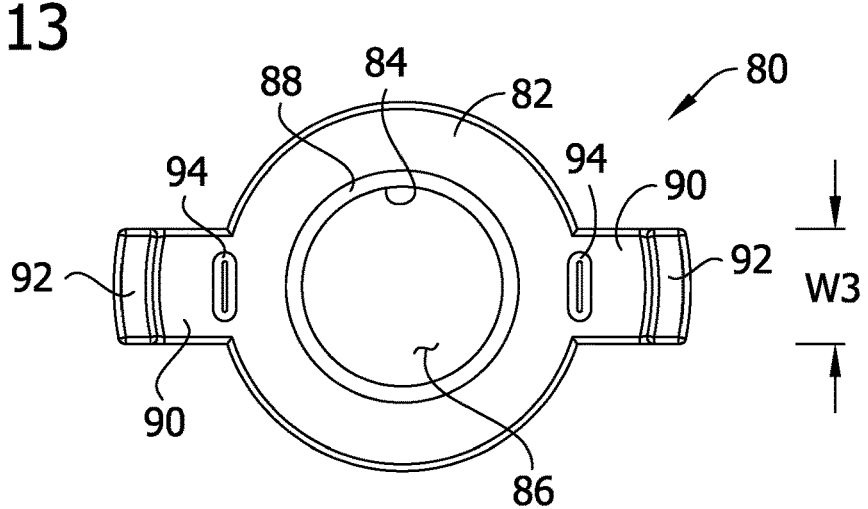
FIG. 13 is a distal end elevation of the rotational locking member.

Referring to FIG. 11, handle tab 96 extends proximally from the proximal end of each arm 90. Thus, in the illustrated embodiment, each handle tab 96 is generally circumferentially aligned with a respective locking tab 92 about the axis A. Similarly, each handle tab 96 is generally circumferentially aligned with a respective detent protrusion 94 in the illustrated embodiment (refer to FIG. 12). It will be understood that a handle tab can extend from a location on the locking rotor besides the arm in other embodiments. In the illustrated embodiment, each handle tab 96 extends generally in radial plane RP (FIG. 11) with respect to the axis A. More specifically, the illustrated handle tabs 96 extend generally in the same radial plane RP. Referring to FIG. 11 and FIG. 13, each of the handle tabs 96 has a width W2 (FIG. 11) and each of the locking tabs 92 has a width W3 (FIG. 13). The widths W2 of the handle tabs 96 are oriented transverse to the widths W3 of the locking tabs 92. In the illustrated embodiment, the width W2 of each handle tab 96 is greater than the width W3 of each locking tab 92. Other handle tabs can have other configurations without departing from the scope of the invention.

In general, each handle tabs 96 are configured to provide a grip to facilitate manipulating the locking rotor 80 during use. More specifically, a user can grasp the handle tabs 96 to rotate the locking rotor 80 about the axis A with respect to the housing 12 between a locked position and an unlocked position. In the locked position (FIGS. 1, 7), the locking tabs 92 are circumferentially aligned with the grooves 48 about the axis A. In the unlocked position (not shown), the locking tabs 92 are circumferentially offset from the grooves 48 about the axis A. It is understood that, when the rotor 80 is mounted on the shaft 24, the locking tabs 92 are arranged to clear the perimeter of the ferrule receiver 22 as the rotor rotates about the axis A between the locked and the unlocked positions.

Figure 14:
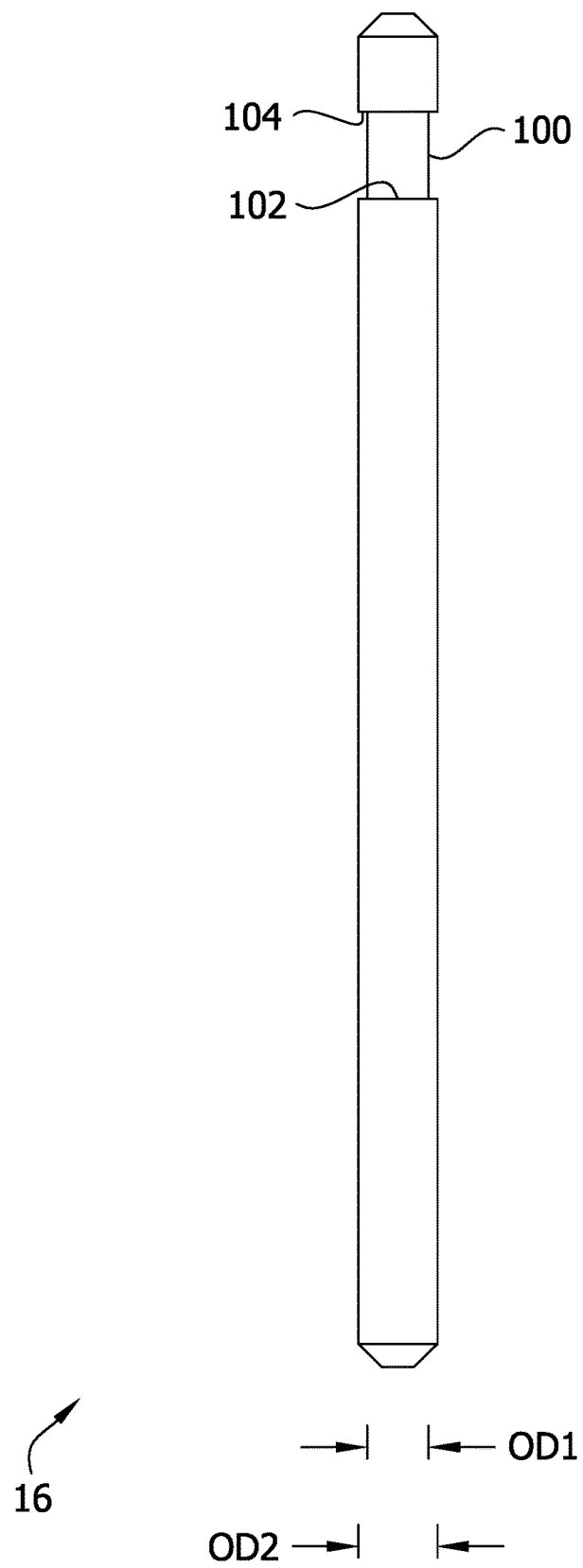
FIG. 14 is an elevation of a guide pin.

Referring to FIGS. 2 and 14, each guide pin 16 has a generally cylindrical shape. Each guide pin 16 has a length extending along an axis of the pin from a proximal end portion to a distal end portion. As shown in FIG. 3, the length of each guide pin 16 is oriented parallel to the length L of the housing when the guide pin is installed in the housing 12. Referring to FIGS. 7, 8, and 14, each guide pin 16 comprises an annular recess 100 adjacent the proximal end portion thereof. The portion of the guide pin 16 defining the recess 100 is sized and arranged for being clipped or fastened into place in a respective guide pin retainer 36. For example, the guide pin 16 has an outer diameter OD1 (FIG. 14) at the recess 100 that is about the same as or somewhat larger than the effective inner diameter ID of the arcuate recesses 39, 40 of each pin retainer 36. Furthermore, the outer diameter OD1 of the pin 16 at the recess 100 is greater than the spacing distance SD between the top and bottom braces 37, 38 at the edges of the recesses 39, 40. Thus, when the portion of a pin 16 that defines the annular recess 100 is received in a pin retainer 36, the ends of the braces 37, 38 at the edges of the recesses 39, 40 provide interference that inhibits the pin from moving laterally along the width W1 of the ferrule receiver 22 with respect to the pin retainer.

As shown in FIG. 14, the guide pin 16 also has a proximally facing distal end surface 102 and a distally facing proximal end surface 104 that define respective ends of the recess 100. As shown in FIG. 7, the proximal and distal end surfaces 102, 104 are spaced apart along the length L of the housing 12 by about the same distance as the proximal and distal ends 36A, 36B of the pin retainer 36. Moreover, the proximal and distal end surfaces 102, 104 have an outer diameter OD2 (FIG. 14) that is larger than the effective inner diameter ID of the pin retainer 36. Thus, the proximal and distal end surfaces 102, 104 engage the proximal and distal ends 36A, 36B, respectively, of the pin retainer 36 when the pin 16 is installed in the pin retainer. The engagement of the proximal and distal end surfaces 102, 104 with the proximal and distal ends 36A, 36B of the pin retainer 36 inhibits the guide pin 16 retainer from moving relative to the pin retainer along the length L of the housing 12.

Referring again to FIG. 2, the ferrule 14 is generally sized and arranged for being received in the interior 34 of the ferrule receiver 22 of the housing 12. The ferrule 14 has a length extending along the length L of the housing 12 from a distal end to a proximal end. As is known in the art, a plurality of optical fibers of an optical fiber cable can be positioned in the ferrule 14 for optical communication through the distal end of the ferrule. The cable can extend from the proximal end of the ferrule 14 through the proximal end of the ferrule receiver 22, the gap 74 between the shaft members 70, 72, and the hole 86 of the locking rotor 80. The ferrule 14 defines guide pin holes 108 that extend along the length of the ferrule from an open distal end to an open proximal end. As shown in FIG. 7, the guide holes 108 are configured to receive portions of the guide pins 16 therein such that the distal ends of the guide pins protrude distally from the distal end of the ferrule 14.

The ferrule 14 has a flange 110 adjacent the proximal end portion that defines a distally facing shoulder 112. In the illustrated embodiment, the shoulder 112 extends about the entire perimeter of the ferrule and includes side portions adjacent the side walls 30, 32 of the ferrule receiver 22. The ferrule can have other configurations in other embodiments. The ferrule 14 is sized and arranged so that, as it is inserted into the open distal end of the ferrule receiver 22, the proximal end of the flange 110 engages the tabs 60 and bends them outwardly at the hinge portions 66. After the ferrule 14 is fully inserted into the housing 12 and the tabs 60 rebound, the shoulder 112 is sized and arranged for engaging the latch surfaces 64 of the tabs 62. The proximal end of the flange 110 simultaneously engages the distal ends 36A of the guide pin retainers 36, which function in this context as distal facing stops of the ferrule receiver 22. The flange 110 is thus captured between the distal facing stops 36A and the latch surfaces 64 of the ferrule receiver 22 and is thereby substantially prevented from moving relative to the housing 12 (e.g., the latch surfaces and distal facing stops substantially prevent the ferrule from moving along the length L of the housing). The connector 10 is free of a ferrule spring between the ferrule 14 and the housing 12. Thus, the ferrule 14 does not float relative to the housing, which can make operatively aligning the ferrule with a floating ferrule of another connector easier in comparison to if both of the ferrules to be connected were floating ferrules.

Referring to FIGS. 2, 7, and 8, to assemble the connector 10, each guide pin 16 is secured to a respective guide pin retainer 36. A user (e.g., an assembler or a manufacturer) inserts each pin 16 into the open distal end of the ferrule receiver 22 and moves the pin through the interior 34. Each pin 16 is placed in the interior 34 so that its proximal end portion is spaced apart outwardly of a respective retainer 36 along the width W1 of the ferrule receiver 22 and so that the annular recess 100 is generally aligned with the respective retainer 36 along the length L of the housing 12. From this position, the user moves each pin 16 in an inward direction along the width W1 so that the portion of the pin defining the respective recess 100 is guided into the flared end of the respective retainer channel 41. The user moves the pin 16 laterally along the width W1 until the portion of the pin defining the annular recess 100 snaps into retainer recesses 39, 40 and is held in place by the respective pin retainer 36 as described above.

Without placing a ferrule spring in the interior 34 of the ferrule receiver 22, the user can install the ferrule 14 over the guide pins 16 that are already secured to the housing 12. Specifically, the user positions the ferrule 14 so that the guide pin holes 108 are aligned with the guide pins 16. The user then moves the housing 12 and guide pins 16 distally with respect to the ferrule 14. In one embodiment, an optical fiber cable (not shown) is connected to the proximal end of the ferrule and is threaded through the proximal end of the housing 12 before moving the ferrule 14 along the guide pins 16. As the user moves the housing 12 distally with respect to the ferrule 14, the guide pins slide distally through the holes 108. Furthermore, the proximal end of the flange 110 engages the inner surfaces 62 of the tabs 60 and bends the tabs outwardly to create lateral space for the ferrule 14 to move proximally through the interior 34 of the ferrule receiver 22. The distal shoulder 112 passes distally beyond the latch surfaces 64 of the tabs 60 as the proximal end of the flange 110 comes to engage the distally facing stop surfaces 36A provided by the pin retainers 36. The tabs 60 rebound inwardly so that the latch surfaces 64 engage the shoulder 112 of the flange 110 and substantially prevent distal movement of the ferrule 112 with respect to the housing. If removal of the ferrule 14 is ever required, access to the tabs 60 is available through the space 68. The user can thus bend the tabs 60 outwardly and then withdraw the ferrule from the interior 34 of the ferrule receiver 22 without interference.

Figure 15A:
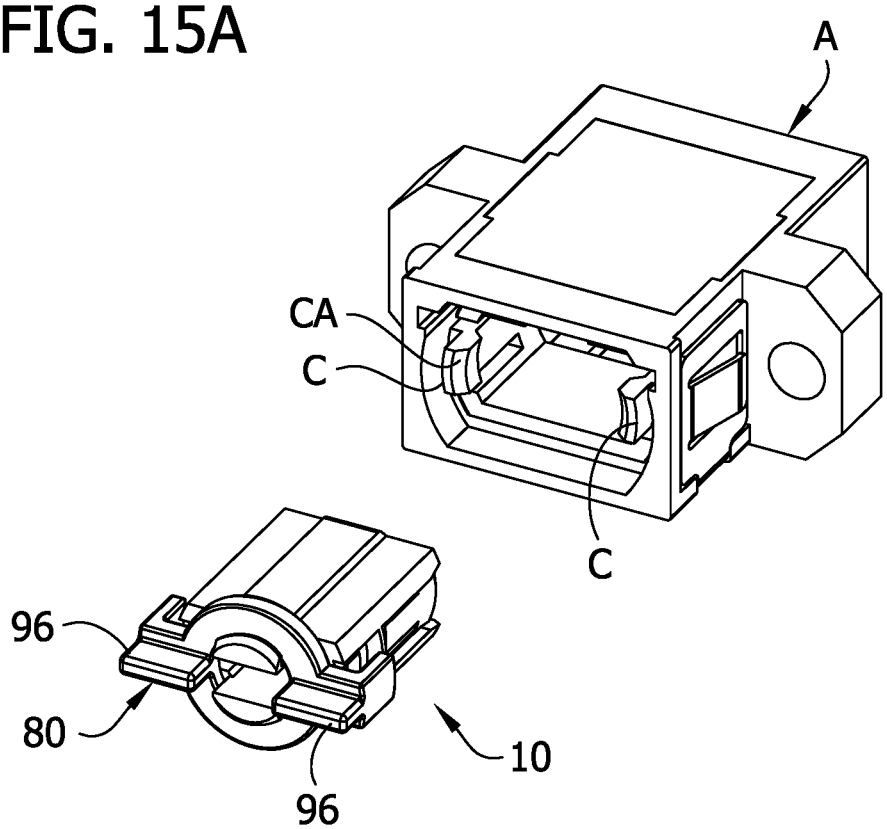
FIGS. 15A-15F illustrate a sequence of inserting the connector into the adapter and locking the connector in the adapter.
Figure 15B:
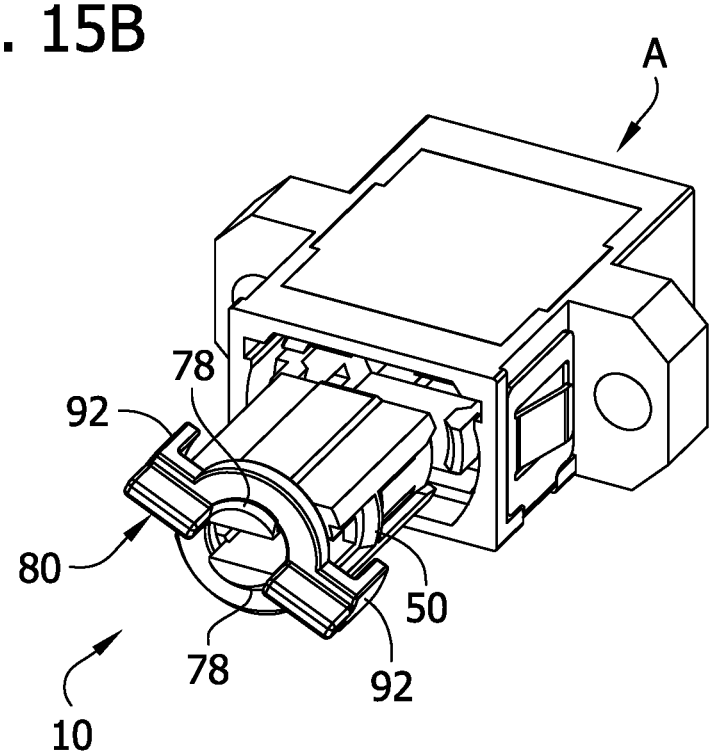
Figure 15C:
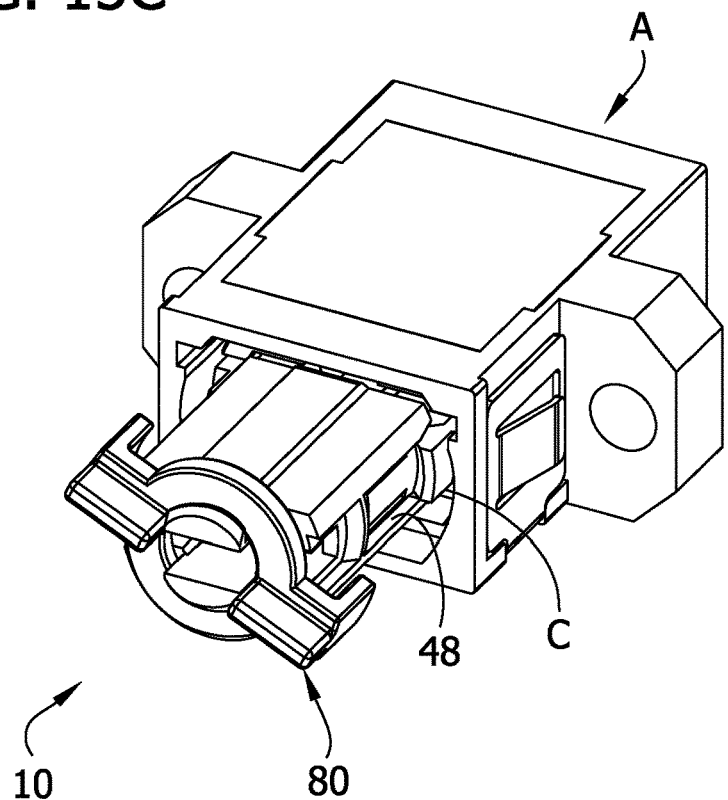
Figure 15D:
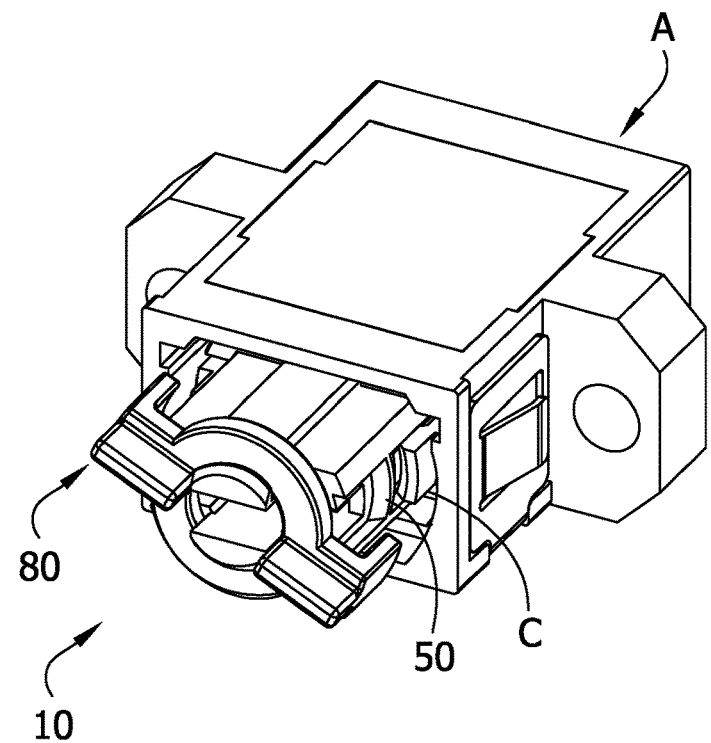
Figure 15E:
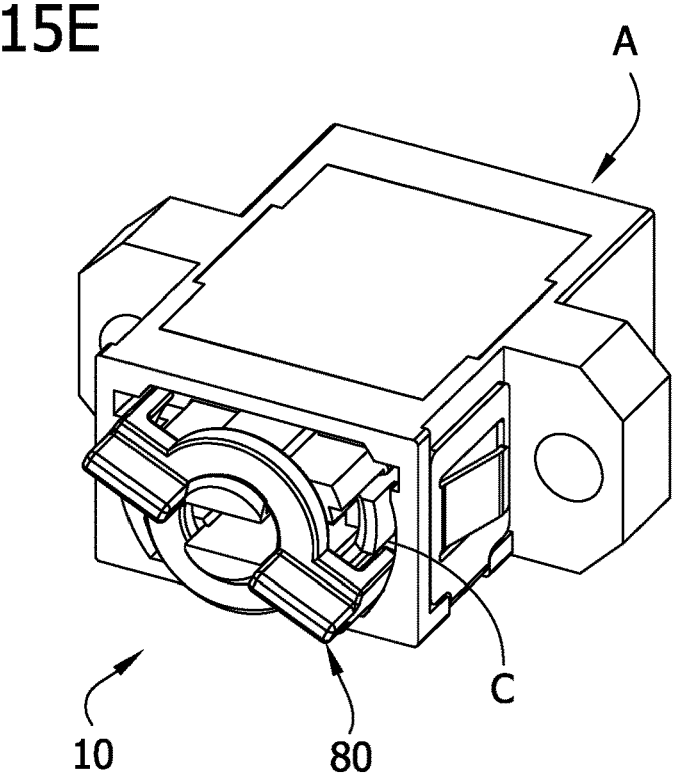
Figure 15F:
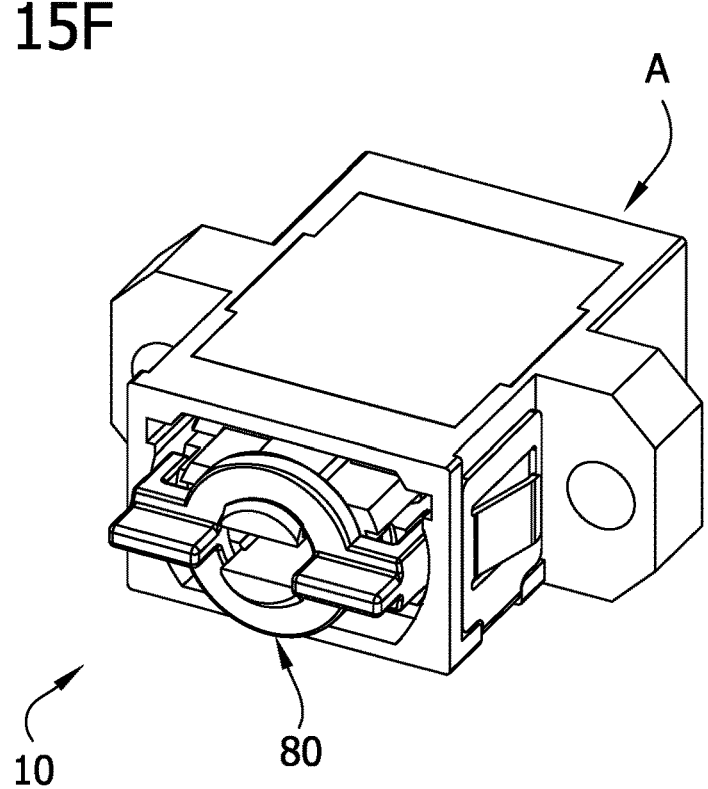
Figure 16:
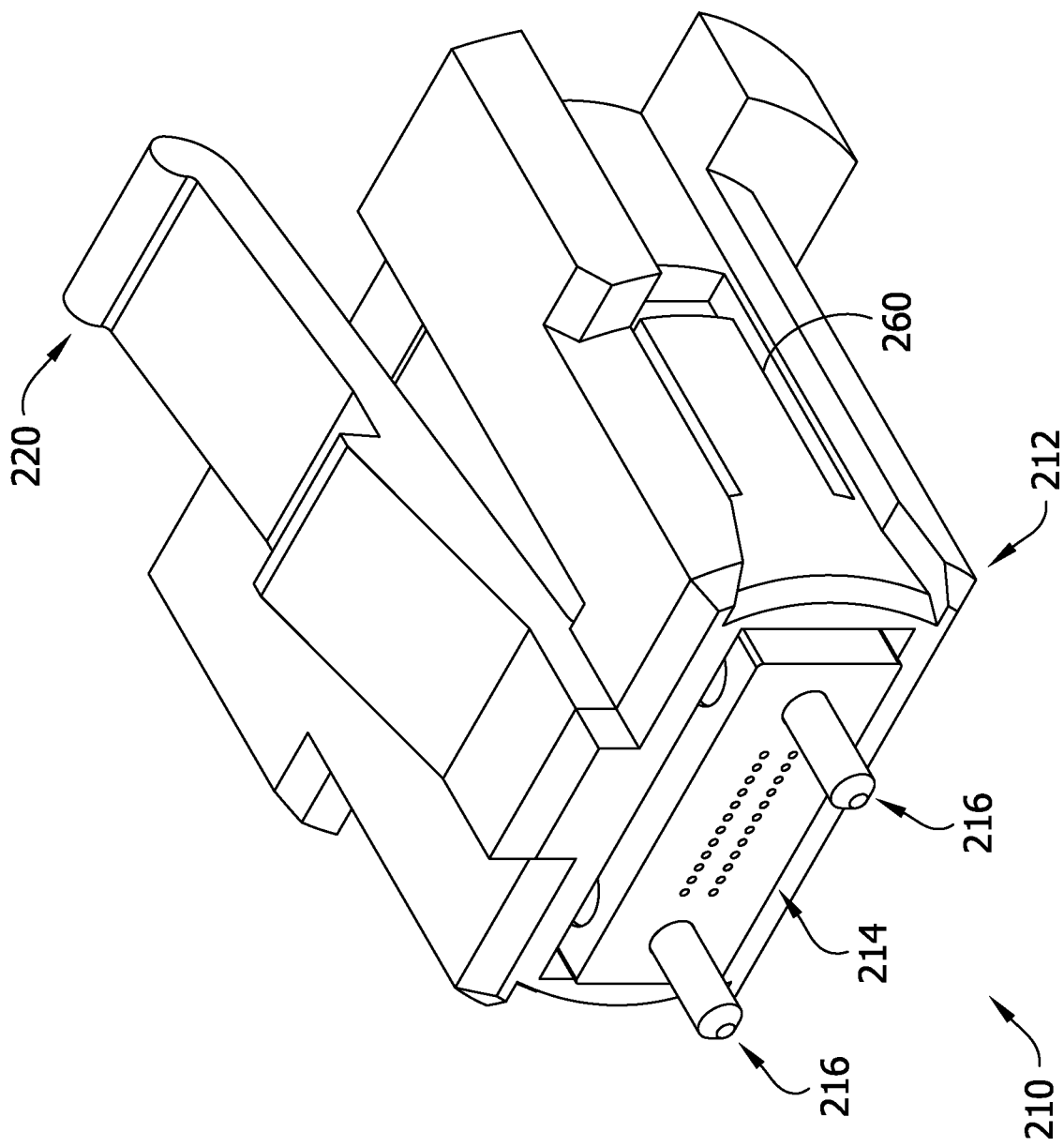
FIG. 16 is a perspective of another embodiment of an optical fiber connector comprising a locking latch.
Figure 17:
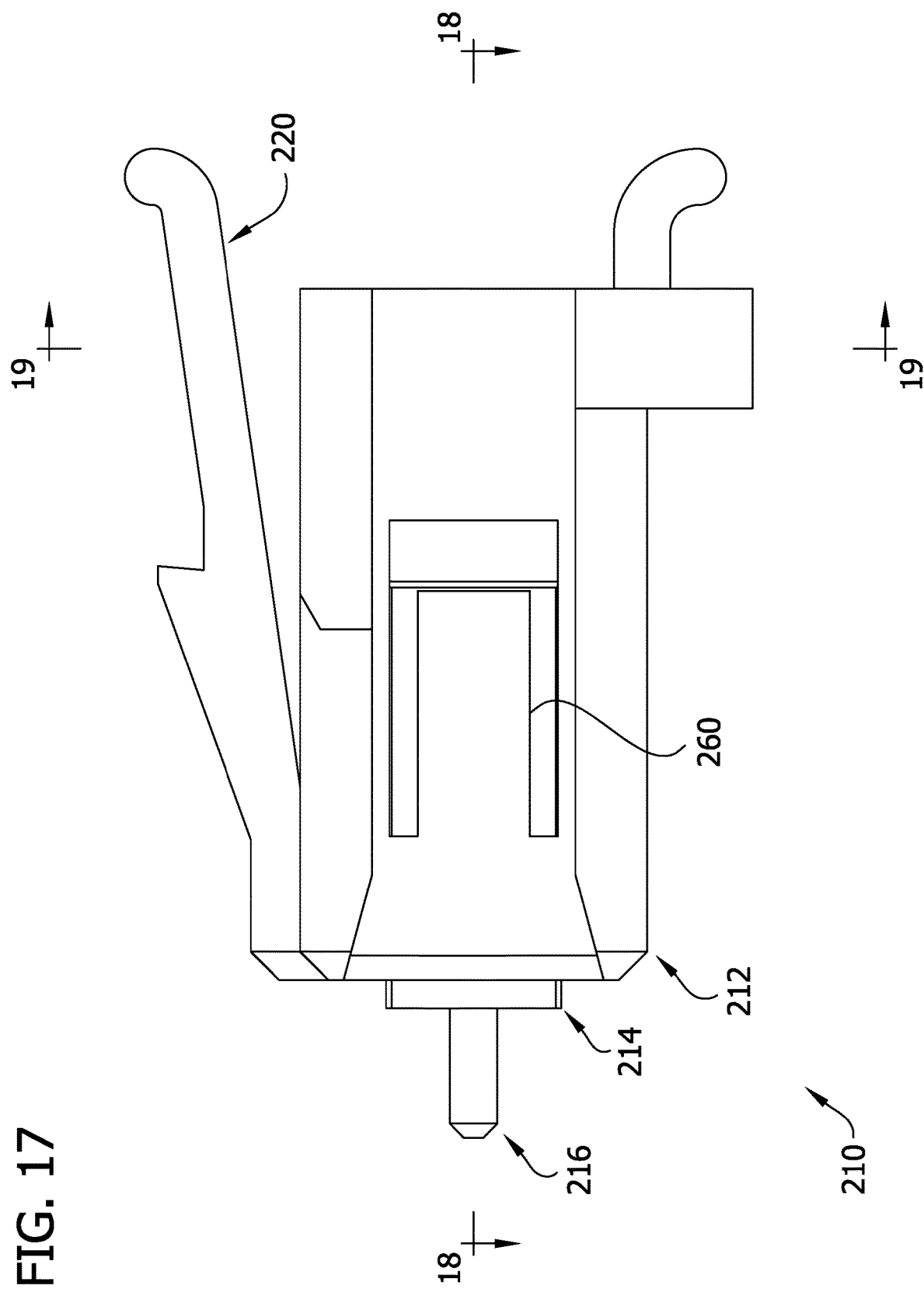
FIG. 17 is an exploded perspective of the connector of FIG. 16.
Figure 18:
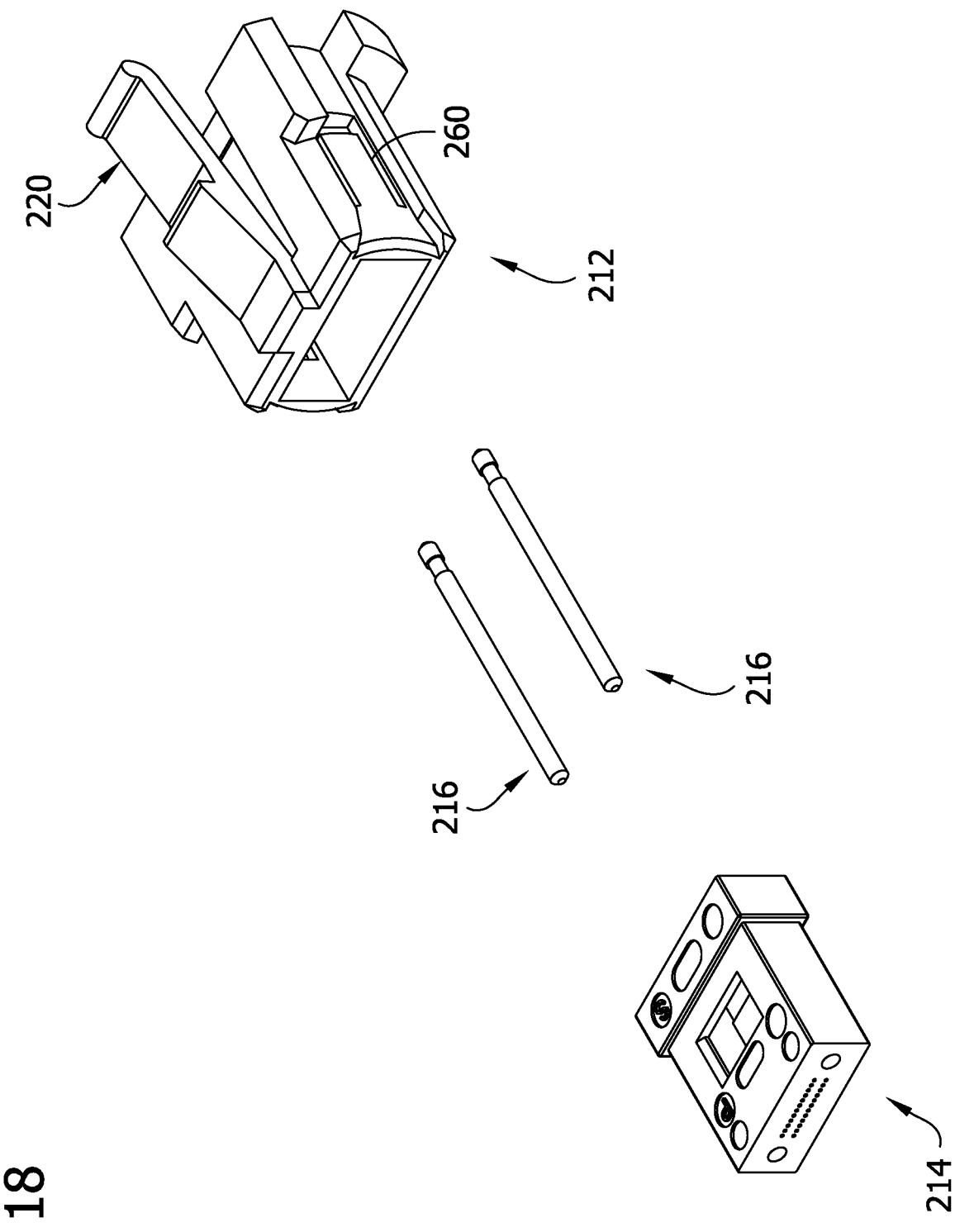
FIG. 18 is a side elevation of the connector of FIG. 16.
Figure 19:
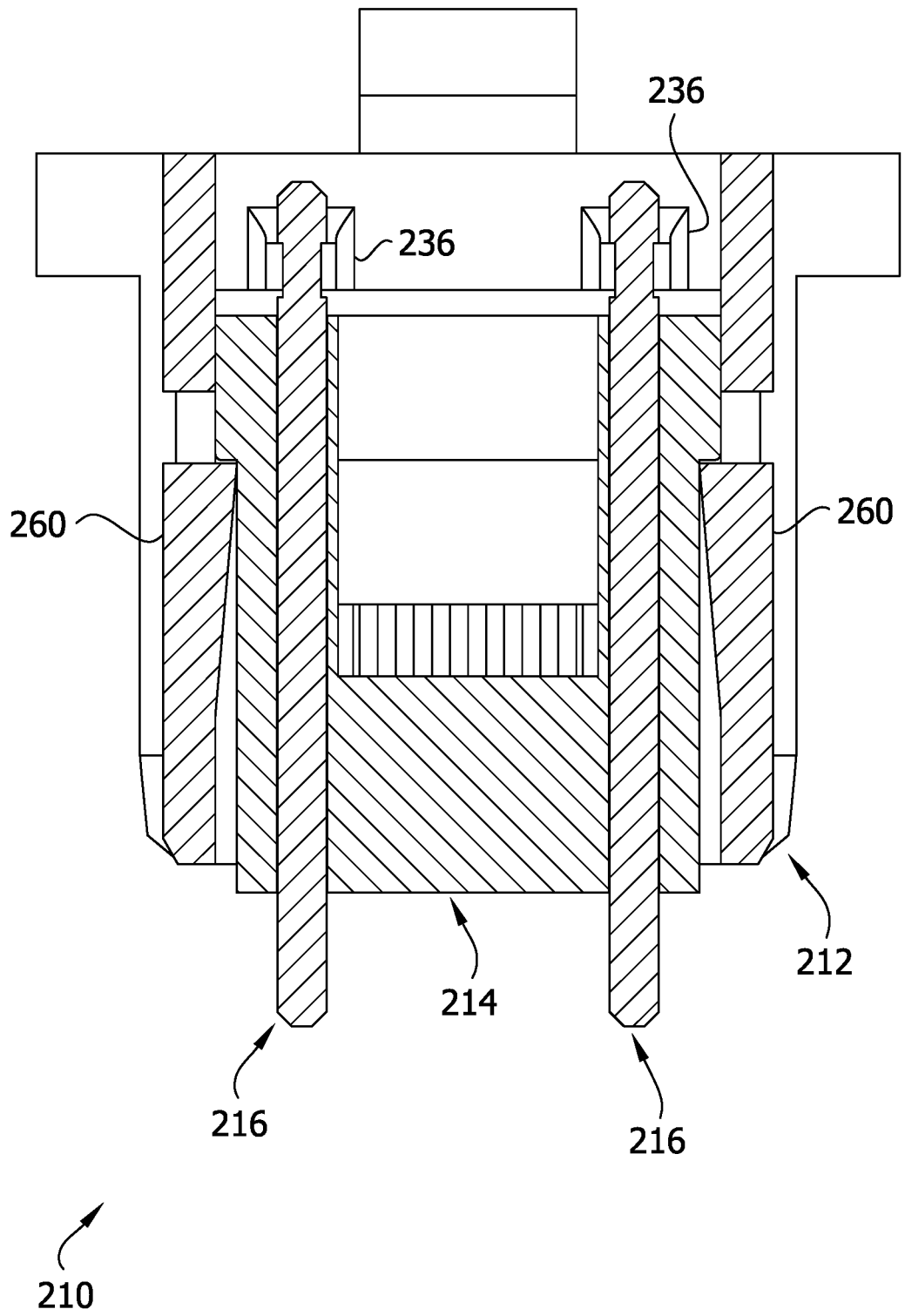
FIG. 19 is a cross section taken in the plane of line 19-19 of FIG. 18.
Figure 20:
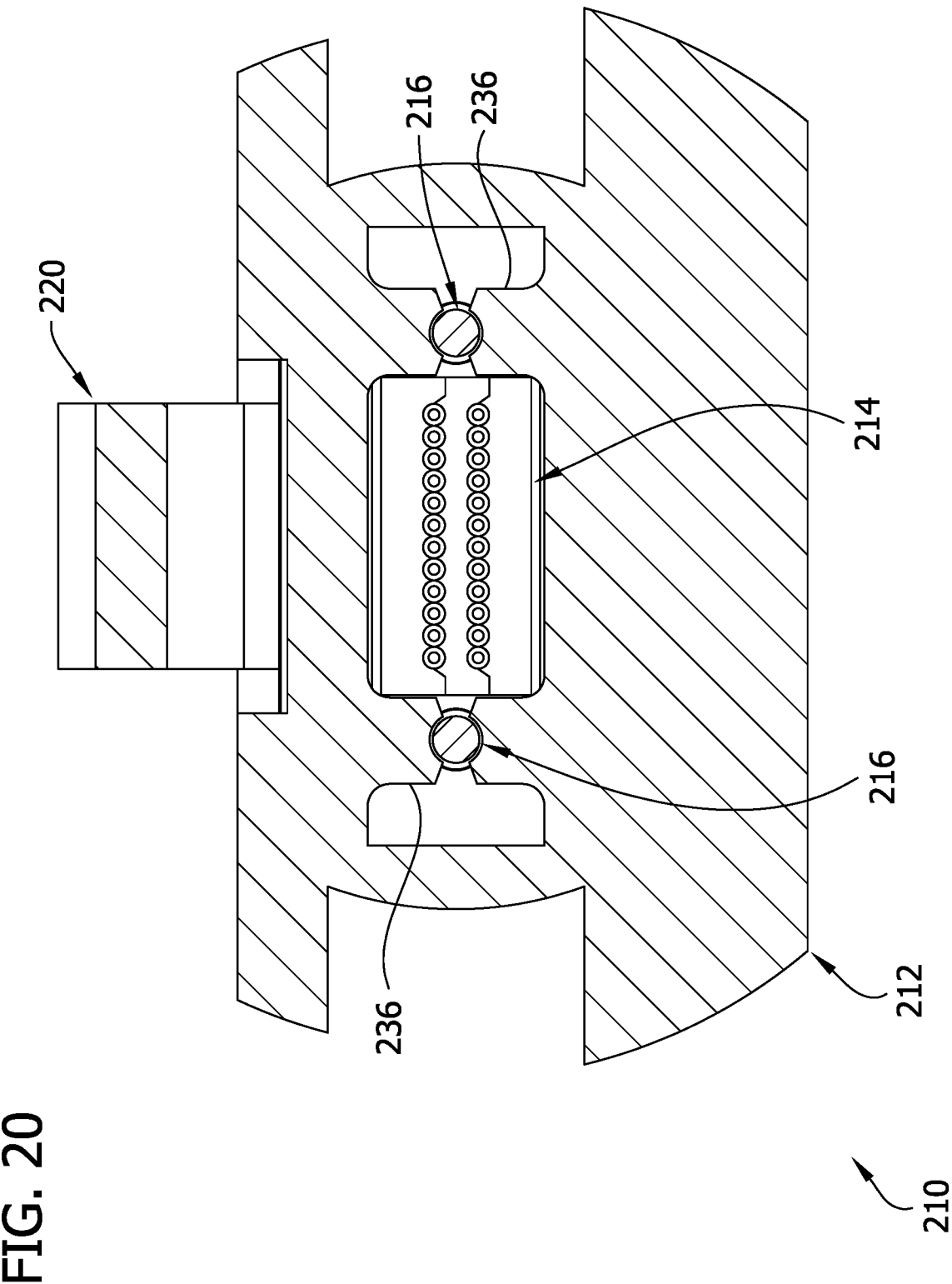
FIG. 20 is a cross section taken in the plane of line 20-20 of FIG. 18.

At any point in the assembly process, the locking rotor 80 can be pressed onto the locking mechanism shaft 24 of the housing 12 as described above. After the connector 10 is assembled, a user can install the connector into the adapter A for making an optical connection. Referring now to FIGS. 7 and 15A-15F, the user aligns the connector 10. The locking rotor 80 is rotated (e.g., clockwise) from the position shown in FIG. 15A to the offset position shown in FIG. 15B. The locking rotor 80 may be turned until the handle tabs 96 engage respective ends of the barbs 78 on the shaft members 70, 72. This prevents over-rotation of the locking rotor 80 so that the locking tabs 92 will not engage the adapter A and block connection. The connector 10 is then inserted distally into the adapter A as indicated by the sequence of FIGS. 15C-15E. As the connector 10 moves into the adapter A, the catches C of the adapter slide along the grooves 48. The sloped outer end CA of each catch C slidably engages the sloped distal end 50A of the rib 50, causing the catch to deflect outwardly such that the rib can move distally past the catch. After the connector 10 has been inserted into the adapter A, a user can grasp the handle tabs 96 to rotate the locking rotor 80 to the locked position as shown in FIG. 15F. As the user rotates the locking rotor 80 to the locked position, the detent protrusions 94 slide along the proximal end of the ferrule receiver 22 until they are received in the slots 46 (see, FIG. 1). The detent protrusions 94 being received in the slots 46 provides tactile feedback, which can be perceived at the handle tabs 96, that indicates the locking mechanism 20 is in the locked configuration. In the locked position of the rotor 80, the locking tabs 92 radially and circumferentially overlap the catches C. The locking tabs 92 thus prevent the catches C from deflecting or bending laterally outwardly. Since the catches C cannot deflect outwardly, the inner catch surfaces CB form fixed stops that oppose the proximal surfaces 50B of the ribs 50, which function as opposing stops. The stops prevent proximal movement of the connector 10 with respect to the adapter A while the locking mechanism 20 is in the locked configuration.

To unlock the locking mechanism 20, the user rotates the rotor 80 about the axis A away from the locked position to an unlocked position. With a moderate rotational force, the detent protrusions 94 can pass out of the slots 46. When the rotor 80 is rotated to the unlocked position, the locking tabs 92 are circumferentially spaced apart from the catches C with respect to the axis A. Accordingly, when the user imparts a proximal force on the connector 10, the catch C can deflect outwardly to allow the sloped inner end CB of the catch C to slide past the sloped proximal end 50B of the rib 50.

Referring to FIGS. 16-20, another embodiment of an optical fiber connector is generally indicated at reference number 210. The connector 210 is similar in many respects to the connector 10, and corresponding parts are given corresponding reference numbers, plus 200. The major difference between the connector 210 and the connector 10 is the nature of the locking mechanism 220. The connector mechanism 210 comprises a latch-type locking mechanism 220 that is formed integrally with the housing 212 for a single monolithic piece of material. Latch-type locking mechanisms are well understood to those skilled in the art.

Like the connector 10, the connector 210 comprises, in addition to the housing 212, a ferrule 214 and guide pins 216. The guide pins 216 and the ferrule 214 can be identical to the guide pins 16 and the ferrule 14 described above in certain embodiments. Like the housing 12, the sides of the housing 212 define tabs 260 for latching the ferrule 214 in place inside the housing. The tabs 260 secure the ferrule 214 in the housing without a ferrule spring in the illustrated embodiment, just as the tabs 60 secure the ferrule 14 as described above. The housing 212 further comprises guide pin retainers 236 (see, FIGS. 19 and 20) that function in the same way as the guide pin retainers 36 described above. Thus, like the connector 10, the connector 210 is configured to secure the guide pins 216 in the housing without using a separate pin holder.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An optical fiber connector comprising:
an optical fiber ferrule;
a single-piece housing, the ferrule being received inside the housing, the housing being configured to be installed in an adapter to make an optical connection; and
a rotational locking mechanism comprising a rotor mounted on the housing for rotation with respect the housing about a rotational axis, the rotor being rotatable between a locked position and an unlocked position, the rotational locking mechanism further comprising a guide pin, wherein the housing comprises an integral guide pin retainer configured to hold the guide pin in place on the housing, and further wherein the housing comprises a shaft extending along the rotational axis, the rotor being mounted on the shaft for rotation with respect to the shaft about the axis, and wherein the rotor is further configured to be pressed onto the shaft, the rotor comprising a chamfered edge surface that is configured to engage the shaft and resiliently compress the shaft radially of the rotational axis as the rotor is pressed onto the shaft.

2. An optical fiber connector as set forth in claim 1, wherein the rotor comprises a protrusion on one of the housing and the rotor configured to engage the other of the housing and the rotor to provide a restraint against rotation of the rotor about the axis away from the locked position.

3. An optical fiber connector as set forth in claim 2 wherein the protrusion is on the rotor.

4. An optical fiber connector as set forth in claim 3, wherein the housing has a distal end portion and a proximal end portion that are spaced apart along the rotational axis, wherein the protrusion is configured to engage the proximal end portion of the housing when the rotor is in the locked configuration.

5. An optical fiber connector as set forth in claim 4, wherein the proximal end portion of the housing defines a recess that is configured to receive the protrusion therein when the rotor is in the locked configuration.

6. An optical fiber connector as set forth in claim 2, wherein the rotor comprises a handle tab extending from the rotor and configured to provide a grip for manually rotating the rotor with respect to the housing.

7. An optical fiber connector as set forth in claim 6, wherein the handle tab extends from an opposite end of the rotor body along the axis away from the housing.

8. An optical fiber connector as set forth in claim 6, wherein the handle tab comprises a first handle tab and the rotor further comprises a second handle tab that is circumferentially spaced apart.

9. An optical fiber connector as set forth in claim 1, wherein guide pin retainer comprises a top brace and a bottom brace and wherein the guide pin is received between top and bottom braces and urges the top brace and the bottom brace apart from one another.

10. An optical fiber connector as set forth in claim 1, wherein the shaft has a lip and the rotor is configured to clear the lip as the rotor is pressed onto the shaft, wherein the shaft is configured to resiliently rebound after the rotor clears the lip whereby the lip holds the rotor on the housing.

11. An optical fiber connector comprising:
an optical fiber ferrule; and
a single-piece housing having a length with opposing tabs, the ferrule being received inside the housing and secured by said tabs
wherein the housing and the ferrule are configured to be in direct engagement with one another, wherein the direct engagement between the housing and the ferrule is configured to substantially block movement of the ferrule with respect to the housing along the length of the housing; and
wherein the optical fiber connector is free of a ferrule spring, and further wherein the said tab is resiliently deflectable from a first position to a second position as the ferrule is inserted proximally into the housing to an installed position, the tab being configured to resiliently rebound toward the first position when the ferrule reaches the installed position and to engage the ferrule after it resiliently rebounds to inhibit the ferrule from moving distally with respect to the housing.

12. An optical fiber connector as set forth in claim 11, wherein the optical fiber connector is free of a compression spring.

13. An optical fiber connector as set forth in claim 11, further comprising a guide pin, wherein the housing comprises an integral guide pin retainer configured to hold the guide pin in place on the housing.

14. An optical fiber connector as set forth in claim 13, wherein guide pin retainer comprises a top brace and a bottom brace and wherein the guide pin is received between top and bottom braces and urges the top brace and the bottom braces apart from one another.

15. An optical fiber connector as set forth in claim 11, wherein the housing further comprises a stop that is configured to engage the ferrule to inhibit the ferrule from moving distally with respect to the housing when the ferrule reaches the installed position.

16. An optical fiber connector comprising:
an optical fiber ferrule;
a single-piece housing, the ferrule being received inside the housing, the housing being configured to be installed in an adapter to make an optical connection, the housing having a distal end portion and a proximal end portion, the proximal end portion of the housing comprising a shaft having an axis, the shaft comprising first and second shaft members, each of the first and second shaft members having a proximal end portion defining a lip; and
a rotor configured to be mounted on the shaft for rotation with respect the shaft about the axis, the rotor being rotatable between a locked position and an unlocked position, the rotor being configured to inhibit the housing from being withdrawn from the adapter in the locked position of the rotor and to permit the housing to be withdrawn from the adapter in the unlocked position, the rotor comprising a rotor body having a proximal end and a distal end spaced apart along the axis, the rotor body defining a hole extending through the rotor body along the axis and a chamfered edge surface adjacent the distal end of the rotor body that extends around at least a portion of the hole, wherein the rotor is configured to be pressed distally onto the shaft such that the shaft extends through the hole and the lips of the first and second shaft members engage the proximal end of the rotor body to inhibit the rotor from moving proximally along the axis with respect to the shaft, the chamfered edge surface being configured to engage the free ends of the first and second shaft member and deflect the first and second shaft members toward one another as the rotor is pressed onto the shaft.

* * * * *